US009731486B2

(12) United States Patent
Clark et al.

(10) Patent No.: US 9,731,486 B2
(45) Date of Patent: *Aug. 15, 2017

(54) HEAT EXCHANGE DEVICE WITH RING SHAPED THIN SLIT SECTION FOR USE IN LIQUID ADHESIVE SYSTEMS AND RELATED METHODS

(71) Applicant: Nordson Corporation, Westlake, OH (US)

(72) Inventors: Steven Clark, Cumming, GA (US); Victor de Leeuw, Hilvarenbeek (NL); Wesley C. Fort, Cumming, GA (US); Mark A. Gould, Gainesville, GA (US); Leonard J. Lanier, Johns Creek, GA (US); Laurence B. Saidman, Duluth, GA (US); Alexander Wilhelm, Duesseldorf (DE)

(73) Assignee: Nordson Corporation, Westlake, OH (US)

( * ) Notice: Subject to any disclaimer, the term of this patent is extended or adjusted under 35 U.S.C. 154(b) by 78 days.

This patent is subject to a terminal disclaimer.

(21) Appl. No.: 14/659,063

(22) Filed: Mar. 16, 2015

(65) Prior Publication Data

US 2015/0183202 A1 Jul. 2, 2015

Related U.S. Application Data

(63) Continuation-in-part of application No. 14/481,182, filed on Sep. 9, 2014, now Pat. No. 9,615,405.
(Continued)

(51) Int. Cl.
*B67D 7/80* (2010.01)
*B32B 37/12* (2006.01)
(Continued)

(52) U.S. Cl.
CPC .......... *B32B 37/1207* (2013.01); *B05C 5/001* (2013.01); *B05C 11/1042* (2013.01);
(Continued)

(58) Field of Classification Search
CPC ..... B05C 5/001; B05C 5/007; B05C 1/10421; B05C 5/0237; B05C 11/10421;
(Continued)

(56) References Cited

U.S. PATENT DOCUMENTS 3,109,912 A * 11/1963 Cerulli .................. F24H 3/0405
219/544
3,310,843 A * 3/1967 Mancuso .............. B29B 13/022
222/146.1
(Continued)

FOREIGN PATENT DOCUMENTS

DE 1577630 A1 3/1970
DE 10146394 A1 5/2002
(Continued)

OTHER PUBLICATIONS

EP Application No. 14 18 4803, Extended European Search Report dated Jul. 7, 2015, 11 pages.
(Continued)

*Primary Examiner* — Lien Ngo
(74) *Attorney, Agent, or Firm* — Baker & Hostetler LLP

(57) ABSTRACT

A heat exchange device for heating liquid adhesive material to an application temperature suitable for an adhesive bonding application includes a body having an inlet configured to receive a flow of liquid adhesive material and an outlet configured to provide the liquid adhesive material to a dispensing device for the adhesive bonding application. A fluid passageway in the body connects the inlet and the outlet. The fluid passageway includes a thin slit section in the form of an elongated ring shape, having a length along
(Continued)

a fluid flow direction between the inlet and the outlet, the thin slit section further having a first dimension and a second dimension transverse to the fluid flow direction. The first dimension and the length are substantially greater than the second dimension. The heat exchange device further includes a heating element for heating the liquid adhesive material flowing through the thin slit section.

21 Claims, 15 Drawing Sheets

Related U.S. Application Data

(60) Provisional application No. 61/878,254, filed on Sep. 16, 2013.

(51) Int. Cl.
| | | |
|---|---|---|
| *B05C 11/10* | (2006.01) | |
| *B32B 37/06* | (2006.01) | |
| *B05C 5/00* | (2006.01) | |
| *F24H 1/14* | (2006.01) | |
| *H05B 1/02* | (2006.01) | |
| *H05B 3/02* | (2006.01) | |
| *B05B 12/10* | (2006.01) | |
| *B05C 5/02* | (2006.01) | |

(52) U.S. Cl.
CPC .......... *B32B 37/06* (2013.01); *B32B 37/1284* (2013.01); *F24H 1/142* (2013.01); *H05B 1/023* (2013.01); *H05B 3/02* (2013.01); *B05B 12/10* (2013.01); *B05C 5/0237* (2013.01); *B32B 2037/1215* (2013.01); *Y10T 137/6416* (2015.04)

(58) Field of Classification Search
CPC . H05B 1/032; H05B 3/02; H05B 1/02; H05B 3/023; B32B 37/1207; B32B 37/1284; B32B 37/06; B32B 2037/1215; Y10T 137/6416; B05B 12/10
USPC ................................ 222/146.1, 146.2, 146.5
See application file for complete search history.

(56) References Cited

U.S. PATENT DOCUMENTS

| | | | |
|---|---|---|---|
| 3,531,023 | A | 9/1970 | Mercer et al. |
| 4,009,974 | A | 3/1977 | Scholl |
| 4,066,188 | A | 1/1978 | Scholl et al. |
| 5,076,469 | A | 12/1991 | Pleuse et al. |
| 5,539,853 | A * | 7/1996 | Jamaluddin ............. E21B 36/04 166/60 |
| 7,082,262 | B2 | 7/2006 | Clark et al. |
| 7,190,893 | B2 | 3/2007 | Kuebler et al. |
| 7,221,859 | B2 | 5/2007 | Stumphauzer et al. |
| 7,614,525 | B2 | 11/2009 | Saidman |
| 8,309,874 | B2 | 11/2012 | Hou et al. |
| 9,169,088 | B2 | 10/2015 | Chau et al. |
| 9,338,828 | B2 | 5/2016 | McGuffey |
| 2001/0046551 | A1 | 11/2001 | Falck et al. |
| 2005/0230423 | A1 | 10/2005 | Riney et al. |
| 2006/0115247 | A1* | 6/2006 | Stumphauzer .......... F24H 1/142 392/473 |
| 2006/0157517 | A1 | 7/2006 | Fiske et al. |
| 2007/0166018 | A1 | 7/2007 | Stumphauzer et al. |
| 2009/0101669 | A1 | 4/2009 | Hassler, Jr. et al. |
| 2009/0285983 | A1 | 11/2009 | Baldauf et al. |
| 2013/0112709 | A1 | 5/2013 | Ross et al. |

FOREIGN PATENT DOCUMENTS

| | | |
|---|---|---|
| DE | 102005005924 A1 | 1/2007 |
| DE | 202011050452 U1 | 3/2012 |
| EP | 1588771 A2 | 10/2005 |
| WO | 9738798 A1 | 10/1997 |

OTHER PUBLICATIONS

R.G. Watts et al., American Society of Mechanical Engineers, Feedback Control Optimization of a Single Fluid Heat Exchanger, Article, 10 pgs., 1966.

Frank P. Incropera et al., Fundamentals of Heat and Mass Transfer, Sixth Edition, Article, pp. 501, 502, 413, 519, undated.

European Patent Office, Partial European Search Report in EP Application Serial No. 14184803.6, Mar. 6, 2015 (6 pages).

International Application No. PCT/US2016/020614: International Search Report and the Written Opinion dated Jun. 27, 2016, 13 pages.

* cited by examiner

HEAT EXCHANGE DEVICE WITH RING SHAPED THIN SLIT SECTION FOR USE IN LIQUID ADHESIVE SYSTEMS AND RELATED METHODS

CROSS-REFERENCE TO RELATED APPLICATIONS

This application is a continuation-in-part of application Ser. No. 14/481,182, filed Sep. 9, 2014 (pending), which claims priority of U.S. Provisional Patent Application Ser. No. 61/878,254, filed on Sep. 16, 2013 (expired), the disclosures of which are incorporated by reference in their entireties herein.

TECHNICAL FIELD

The present invention generally relates to liquid adhesive systems, and more particularly to heat exchange devices for heating liquid adhesive materials to application temperatures.

BACKGROUND

Thermally insulative properties of hot melt adhesive materials can present challenges relating to effectively transferring heat to a quantity of hot melt adhesive material. In particular, the liquid hot melt adhesive material tends to have higher temperatures in regions near a heater. But because hot melt adhesive materials are somewhat thermally insulative, heat imparted by the heater is not readily transferred through the hot melt adhesive material, and as a result, the liquid adhesive material that is distant from the heater tends to have lower temperatures. In addition, liquid adhesive materials do not generally flow in a manner that encourages heat distribution.

SUMMARY

Embodiments of the invention are directed to heat exchange devices, adhesive systems, and related methods. In particular, the heat exchange devices are configured to heat a liquid adhesive material to an application temperature suitable for an adhesive bonding application. The heat exchange devices are coupled, either directly or indirectly, with a dispensing device. The heat exchange devices include fluid passageways having thin slit sections through which the liquid adhesive material is directed and heated. Advantageously, the temperature of liquid adhesive materials can be maintained at lower temperatures before they reach the heat exchange devices, thereby reducing the energy consumed in heating the liquid adhesive material. Also advantageously, by maintaining the liquid adhesive materials at lower temperatures, the degradation effects of elevated temperatures may be avoided or lessened. In addition, the shape of the fluid passageways, and their thin slit sections, extending through the heat exchange devices tends to encourage even and thorough heating of the liquid adhesive material.

According to one embodiment of the invention, a heat exchange device is provided for heating liquid adhesive material to an application temperature suitable for an adhesive bonding application. The heat exchange device includes a body having an inlet configured to receive a flow of liquid adhesive material and an outlet configured to provide the liquid adhesive material to a dispensing device for the adhesive bonding application. The heat exchange device further includes a fluid passageway defined in the body connecting the inlet and the outlet and configured to receive the flow of liquid adhesive material. The fluid passageway includes a thin slit section having a length along a fluid flow direction between the inlet and the outlet, the thin slit section further having a first dimension and a second dimension transverse to the fluid flow direction. The first dimension and the length of the thin slit section are substantially greater than the second dimension. More specifically, the profile of the thin slit section is a ring such that the first dimension is a circumference of the ring and the second dimension is a radial thickness of the ring. The heat exchange further includes a heating element thermally coupled with the body and configured for heating the liquid adhesive material flowing through the fluid passageway to the application temperature.

In one aspect, the body of the heat exchange device includes a generally cylindrical socket, and an interior body member extends within the generally cylindrical socket along a longitudinal length thereof to define the thin slit section at an annular gap there between. The heating element therefore provides heat energy to the thin slit section from a radially inward direction (e.g., from the interior body member) and from a radially outward direction (e.g., from the body at the generally cylindrical socket). Because adhesive is a poor thermal conductor, providing this heat energy on both sides of a thin slit section which the adhesive is forced to flow through enables more effective heating of the liquid adhesive material to the application temperature. It will be understood that the heat energy from the interior body member may be generated by a separate heater installed in the interior body member in some embodiments, and this heat energy may be transferred from the remainder of the body in other embodiments.

The heat exchange device in another aspect includes a generally conical passage into the first end of the thin slit section and a ring-shaped channel provided at the second end of the thin slit section. These structures guide the flow of liquid adhesive material into and out of the thin slit section so as to avoid formation of areas with stagnation of flow, which could lead to char, for example. In order to minimize unbalanced pressure forces of the liquid adhesive material acting on the heat exchange device and to maintain a compact design, the fluid passageway divides and recombines the fluid flow using several inlet passages, outlet bores, and thin slit sections in the body. This arrangement of the fluid passageway also enables generally equal pressure and flow rates of liquid adhesive material to be delivered to each of a plurality of dispensing devices connected to the heat exchange device.

According to another embodiment of the invention, a liquid adhesive system is provided and includes an adhesive supply configured to provide a supply of liquid adhesive material and a dispensing device configured for dispensing the liquid adhesive material in an adhesive bonding application. The liquid adhesive system further includes a heat exchange device as described above with a ring-shaped thin slit section, this heat exchange device coupled with the adhesive supply and the dispensing device and configured for heating the liquid adhesive material from the adhesive supply to an application temperature suitable for the adhesive bonding application by the dispensing device. The liquid adhesive system further includes a controller operatively coupled with the heat exchange device and the adhesive supply. The controller is configured to operate the heat exchange device so as to heat the liquid adhesive material to the application temperature and to operate the adhesive supply to maintain the liquid adhesive material at a temperature below the application temperature before it is heated to the application temperature in the heat exchange device.

According to another embodiment of the invention, a method is provided for dispensing liquid adhesive material for an adhesive bonding application. The method includes directing liquid adhesive material from an adhesive supply to a heat exchange device and through a fluid passageway in the heat exchange device. In this regard, the liquid adhesive material flows through a thin slit section of the fluid passageway which is defined between an interior body member and a generally cylindrical socket in the body of the heat exchange device. As such, the thin slit section defines a length along the fluid flow direction, a first ring-shaped circumference dimension transverse to the fluid flow direction, and a second radial thickness dimension transverse to the fluid flow direction which is substantially lesser than the length and the first ring-shaped circumference dimension. The method further includes heating the liquid adhesive material in the thin slit section of the heat exchange device to an application temperature suitable for the adhesive bonding application, by applying heat energy to the thin slit section from a radially inward direction at the interior body member and from a radially outward direction at the generally cylindrical socket. The liquid adhesive material is maintained at temperatures below the application temperature before it is heated in the heat exchange device. The method further includes directing the liquid adhesive material from the heat exchange device to a dispensing device, and dispensing the liquid adhesive material using the dispensing device.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

FIG. 2 is a schematic cross sectional view taken along line 2-2 of FIG. 1 and showing interior features of the heat exchange device of FIG. 1, including an inlet, an outlet, and a fluid passageway there between.

FIG. 6 is a schematic cross sectional view showing features of the assembly of FIG. 4, including an inlet and an outlet in the heat exchange device, and a fluid passageway there between.

DETAILED DESCRIPTION

Referring generally to the figures, exemplary heat exchange devices are shown that are useful for heating liquid adhesive material before the liquid adhesive material is dispensed by a dispensing device. In particular, the heat exchange devices are configured to heat liquid adhesive material to an application temperature suitable for an adhesive bonding application. The heat exchange devices include fluid passageways having thin slit sections through which the liquid adhesive material is directed and heated. The thin slit sections present regions where the liquid adhesive material is quickly and thoroughly heated. As will become apparent from the following description, these heat exchange devices allow liquid adhesive material to be maintained at lower temperatures before being heated by the heat exchange devices to the application temperature for the adhesive bonding application.

As used herein, the term liquid adhesive material refers to at least two general types of liquid adhesive material that are heated before being used for an adhesive bonding application. The first type is created when solid or semi-solid unmelted hot melt adhesive material is heated and melted to form a liquid hot melt adhesive material. The second type is liquid, or generally liquid-like so as to flow, at ambient conditions.

Figures 1, 3:
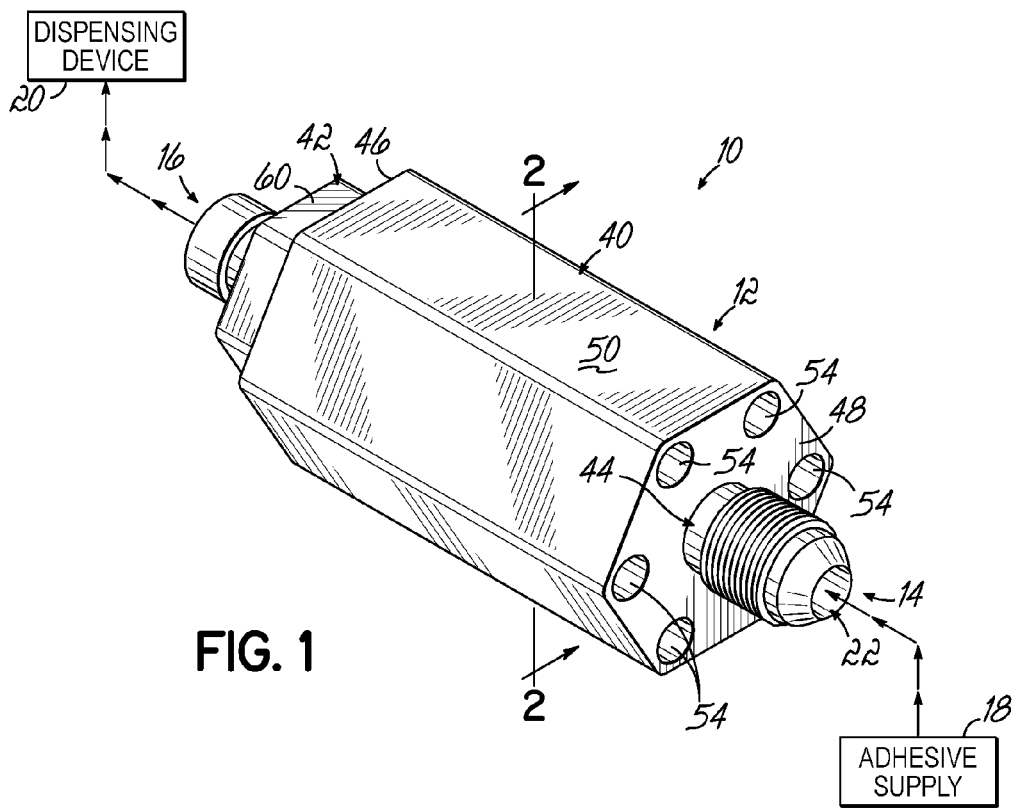
FIG. 1 is an isometric view showing a heat exchange device constructed according to an embodiment of the invention and configured to heat liquid adhesive material to an application temperature suitable for an adhesive bonding application.
FIG. 3 is a schematic cross sectional view taken along line 3-3 of FIG. 2 and further showing interior features of the heat exchange device of FIG. 1, including a thin slit section of the fluid passageway.
Figure 2:
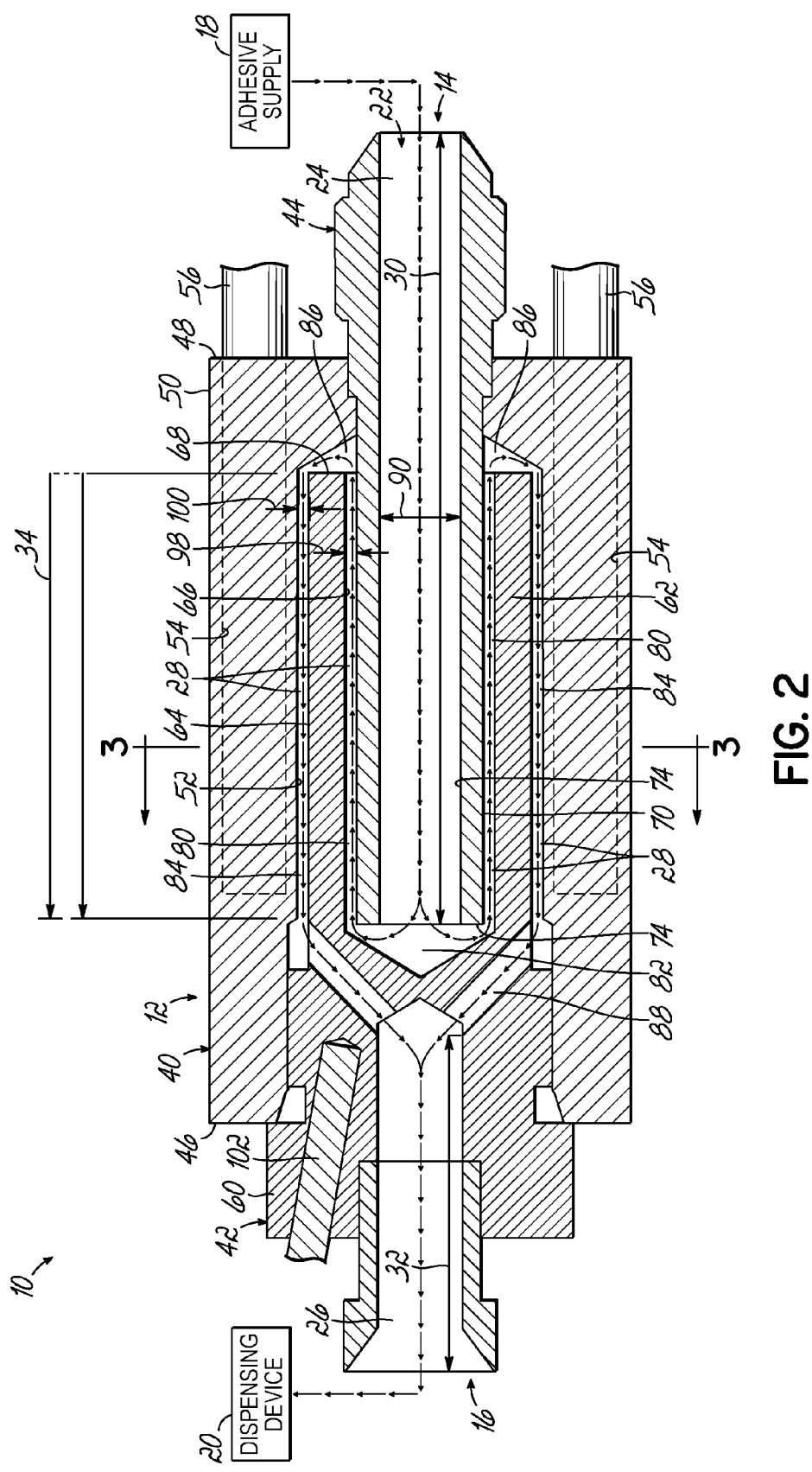
Figure 4:
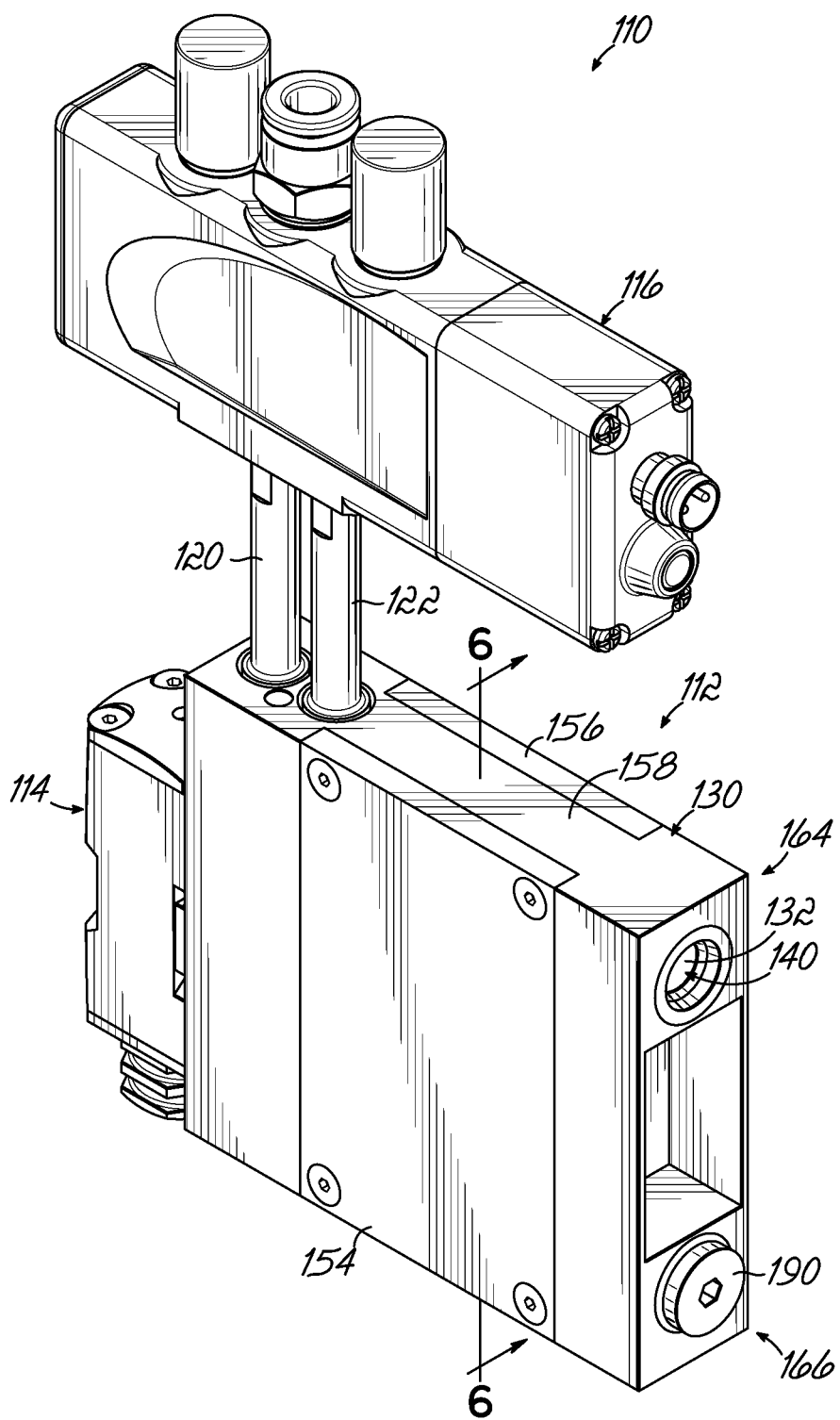
FIG. 4 is an isometric view showing an assembly constructed according to another embodiment of the invention and including a heat exchange device, a dispensing device, and a control device for controlling the dispensing device. The heat exchange device is configured to heat liquid adhesive material to an application temperature suitable for an adhesive bonding application.
Figure 5:
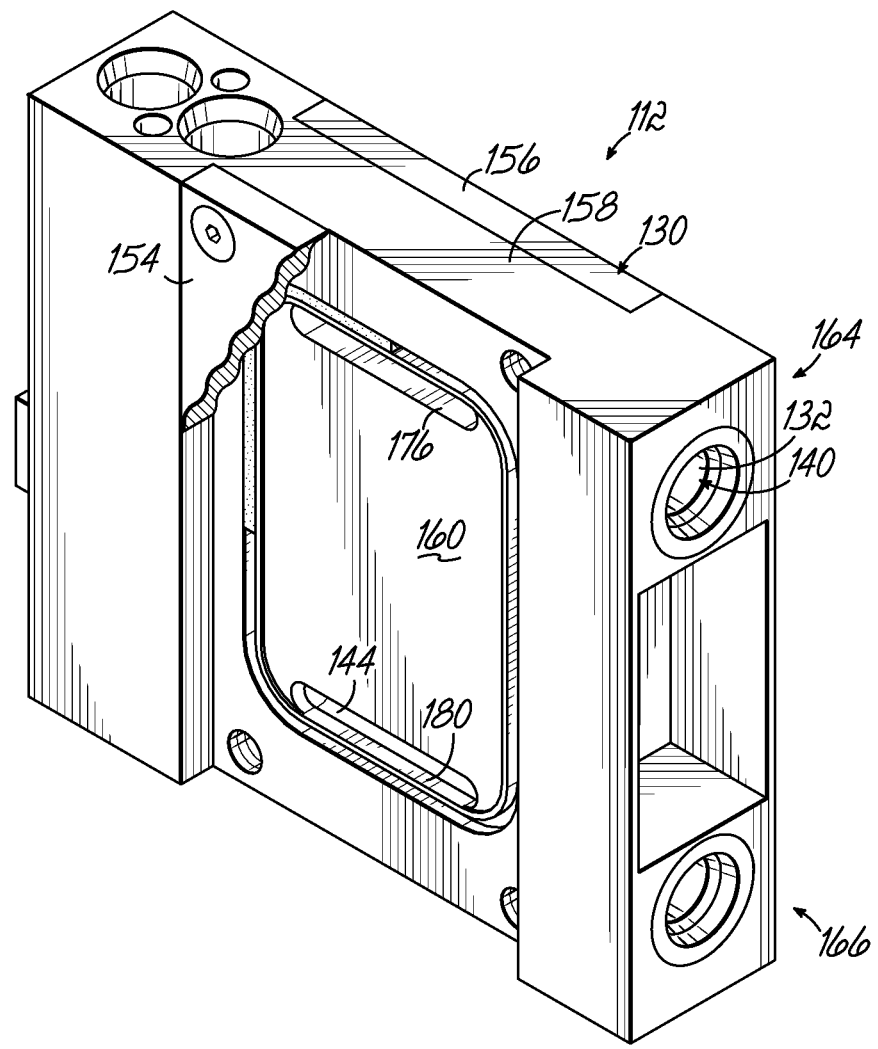
FIG. 5 is an isometric view showing the heat exchange device of FIG. 4 with outer walls thereof removed.

Beginning with FIGS. 1-3, a heat exchange device 10 generally includes a body 12 having an inlet 14 and an outlet 16. The inlet 14 is configured to receive a flow of liquid adhesive material, such as from an adhesive supply 18, which provides the liquid adhesive material. The adhesive supply 18 generally includes components upstream from the heat exchange device 10, and can include, for example, any or all of a tank, grid, reservoir, manifold, and hoses. The adhesive supply 18 may optionally heat the liquid adhesive material. The outlet 16 of the body 12 of the heat exchange device 10 is configured to provide the liquid adhesive material heated in the heat exchange device 10 to a dispensing device 20.

A fluid passageway 22 is defined in the body 12 and connects the inlet 14 and the outlet 16. The heat exchange device 10 is configured to heat liquid adhesive material that flows through the fluid passageway 22. The fluid passageway 22 includes an inlet section 24, an outlet section 26, and a thin slit section 28 located between the inlet section 24 and the outlet section 26. All of the sections 24, 26, 28 have lengths along a fluid flow direction between the inlet 14 and the outlet 16. Particularly, the inlet section 24 has a length 30, the outlet section 26 has a length 32, and the thin slit section 28 has a length 34. Based on engineering heat transfer principles, it will be understood that the thin slit section 28 will have the highest Nusselt number or numbers, compared with the other fluid flow sections.

In the embodiment shown, the body 12 is comprised of generally concentrically arranged body segments, including a first body segment 40, a second body segment 42, and a third body segment 44. Referring to FIGS. 2 and 3, the first body segment 40 is generally radially outside both the second and third body segments 42, 44. The second body segment 42 is received within the first body segment 40 near a first end 46 thereof. Thus, the second body segment 42 is generally radially inside the first body segment 40.

The third body segment 44 is received within the first body segment 40 near a second end 48 thereof. The third body segment 44 is also received within the second body segment 42. Thus, the third body segment 44 is generally radially inside the first and second body segments 40, 42.

The first body segment 40 includes an outer surface 50 having a generally hexagonal shape. It will be appreciated that other shape configurations are possible for the body 12, including for the first body segment 40. The first body segment 40 also includes an inner surface 52 that is contoured to engage with the second and third body segments 42, 44, as shown. Sockets 54 are formed in the first body segment 40 between the outer surface 50 and the inner surface 52 for receiving heating elements 56. The heating elements 56 are thereby thermally coupled with the body 12. In the embodiment shown, the first body segment 40 includes six sockets 54 for receiving up to six heating elements 56, although different numbers of sockets and heating elements could also be used. It will be appreciated that other configurations are possible for thermally coupling the heating elements 56 with the body 12. The body 12, including its body segments 40, 42, 44, may be formed of a heat conductive material so that heat generated by the heating elements 56 is transferred through the body 12 to the liquid adhesive material flowing through the fluid passageway 22.

The second body segment 42 includes a base portion 60 positioned near the first end 46 of the first body segment 40. The outlet 16 is in the base portion 60. Also, the outlet section 26 of the fluid passageway 22 is defined generally within the base portion 60.

The second body segment 42 also includes an extension portion 62 extending from the base portion 60 toward the second end 48 of the first body segment 40. The extension portion 62 has a generally open cylindrical shape and includes an outer surface 64 and an inner surface 66. The extension portion 62 terminates at a distal end 68.

The third body segment 44 has a generally open cylindrical shape and includes an outer surface 70 and an inner surface 72. The third body segment 44 terminates at a distal end 74. The inlet section 24 of the fluid passageway 22 is defined generally within the inner surface 72 of the third body segment 44.

The thin slit section 28 of the fluid passageway 22 is defined partially between the third body segment 44 and the second body segment 42, and partially between the second body segment 42 and the first body segment 40. In particular, a first leg 80 of the thin slit section 28 is defined between the outer surface 70 of the third body segment 44 and the inner surface 66 of the second body segment 42. A transition section 82 connects the inlet section 24 with the first leg 80 near the distal end 74 of the third body segment 44.

A second leg 84 of the thin slit section 28 is defined between the outer surface 64 of the second body segment 42 and the inner surface 52 of the first body segment 40. A transition section 86 connects the first leg 80 and the second leg 84 of the thin slit section 28 near the distal end 68 of the second body segment 42.

The second leg 84 of the thin slit section 28 is connected with the outlet section 26 of the fluid passageway 22 by a transition section 88. The thin slit section length 34, therefore, generally includes the length of the first leg 80 and the second leg 84.

The fluid passageway 22 thereby follows a winding path within the body 12. This increases the length of the fluid passageway 22 for the given size of the body 12, and may serve to somewhat mix the liquid adhesive material flowing through the fluid passageway 22. Also, by increasing the length of the fluid passageway 22, the dwell time for the liquid adhesive material in the fluid passageway 22 may be increased.

Liquid adhesive material flows through the heat exchange device 10 as follows. First, the liquid adhesive material enters the inlet 14 and flows in the inlet section 24 of the fluid passageway 22 in a fluid flow direction toward the outlet 16. The liquid adhesive material flows from the inlet section 24 through the transition section 82 and into the first leg 80 of the thin slit section 28. The liquid adhesive material flows from the first leg 80 through the transition section 86 and into the second leg 84 of the thin slit section 28. The liquid adhesive material flows from the second leg 84 through the transition section 88 and into the outlet section 26. Finally, the liquid adhesive material flows through the outlet section 26 and exits through the outlet 16. The liquid adhesive material is heated as it flows through the fluid passageway 22, including the thin slit section 28.

Referring especially to FIG. 3, features of the thin slit section 28 are further described. Again, the thin slit section 28 includes a first leg 80 and a second leg 84. FIG. 3 shows a cross sectional view transverse to the fluid flow direction in the fluid passageway 22. As shown in that figure, the first leg 80 of the thin slit section 28 is defined between the outer surface 70 of the third body segment 44 and the inner surface 66 of the second body segment 42. Also, the second leg 84 of the thin slit section 28 is defined between the outer surface 64 of the second body segment 42 and the inner surface 52 of the first body segment 40.

The inlet section 24 has a profile transverse to the fluid flow direction having a generally circular shape. That profile is characterized by a height dimension 90 and a width dimension 92. Because the profile of the inlet section 24 is generally circular, the height and width dimensions 90, 92 are generally equal. Other shape profiles for the inlet section 24 are also possible, so long as the height and width dimensions 90, 92 are equal, or generally equal (such as would be the case with square, rectangular, or oval-shaped profiles, for example).

Although the outlet section 26 is not shown in FIG. 3, it is similar to the inlet section 24 in that it has a profile transverse to the fluid flow direction having a generally circular shape. The outlet section 26 is also characterized by a height dimension and a width dimension that are equal, or generally equal, as discussed above with respect to the inlet section 24.

FIG. 3 also shows that the first and second legs 80, 84 of the thin slit section 28 have profiles transverse to the fluid flow direction having ring shapes. The ring shapes are characterized by first dimensions 94, 96, respectively, which are the circumferences of the ring shapes of the first and second legs 80, 84. The ring shapes are also characterized by second dimensions 98, 100, respectively, which are the radial thicknesses of the ring shapes of the first and second legs 80, 84. The circumferences 94, 96 of the ring shapes are substantially greater than the radial thicknesses 98, 100. In addition, the thin slit section length 34, and the length of the first and second legs 80, 84 thereof, are all substantially greater than the radial thicknesses 98, 100.

The thin slit section 28 of the fluid passageway 22 presents a region in the heat exchange device 10 where a large surface area of the body 12 contacts a relatively small volume of liquid adhesive material. Under such conditions, heat is quickly and effectively transferred from the body 12 to the liquid adhesive material. In particular, heat transferred from the body 12 spreads across the entire quantity of liquid adhesive material flowing through the radial thicknesses 98, 100 of the first and second legs 80, 84, respectively, of the thin slit section 28. Thereby, the liquid adhesive material flowing in the first and second legs 80, 84 is evenly and thoroughly heated. As a consequence, localized and uneven heating of liquid adhesive material is unlikely, and the heat exchange device 10 provides advantageous control over heating liquid adhesive material.

As shown in FIG. 2, the heat exchange device 10 can include a temperature sensor 102 for measuring the temperature of the liquid adhesive material flowing through the fluid passageway 22, and in particular exiting the outlet 16. In the embodiment shown, the temperature sensor 102 is coupled with the body 12 in the second body segment 42 thereof. Advantageously, the temperature sensor 102 is positioned at a location to measure the temperature of the liquid adhesive material after it has been at least partially heated by the heat exchange device 10. For example, and as shown, the temperature sensor 102 is located near the transition section 88 which connects the second leg 84 of the thin slit section 28 with the outlet section 26. Liquid adhesive material is at least partially, if not substantially, heated when it reaches the transition section 88. It will also be noted that the temperature sensor 102 is closer to the fluid passageway 22 (at its closest point) than to either one of the heating elements 56. As another optional definition of the proximity of the temperature sensor 102 to the adhesive fluid flow path or fluid passageway 22, the shortest distance from the sensor 102 to the fluid passageway 22 should be less than 1/10 of the total length of the fluid passageway 22, and preferably, less than 1/20 of the total length of the fluid passageway 22. And as discussed above, the thin slit section 28 encourages even and thorough heating of liquid adhesive material flowing through the fluid passageway 22. As a result, a temperature measurement taken by the temperature sensor 102 accurately reflects the temperature of the liquid adhesive material after it has been at least partially heated by the heat exchange device 10. It will be appreciated that the temperature sensor 102 could also be positioned at other suitable locations.

In some embodiments, the temperature sensor 102 is positioned at a location such that the heat exchange device 10 can quickly respond to measured temperature values. Particularly, the temperature sensor 102 can be positioned to measure the temperature of liquid adhesive material flowing in the fluid passageway 22 at a location where (1) the amount of time it takes the liquid adhesive material to flow from that location to the outlet 16 is approximately equal to (2) the amount of time it takes the heat exchange device 10 to change the temperature of the liquid adhesive material flowing in the fluid passageway 22 to the desired temperature.

Referring next to FIGS. 4-8, an assembly 110 includes a heat exchange device 112, a dispensing device 114, and a control device 116 for controlling the dispensing device 114. As shown, the heat exchange device 112 is directly coupled with the dispensing device 114. The dispensing device 114 includes an internal valve mechanism for controlling the flow of liquid adhesive material out of a dispensing opening 118. The valve mechanism of the dispensing device 114 is operatively coupled with air conduits 120, 122 of the control device 116 for controlling the operation of the valve mechanism.

The heat exchange device 112 includes a body 130 having an inlet 132 and an outlet 134. The inlet 132 is configured to receive a flow of liquid adhesive material, such as from an adhesive supply 136, which provides the liquid adhesive material. The adhesive supply 136 generally includes components upstream from the heat exchange device 112, and can include, for example, any or all of a tank, grid, reservoir, manifold, and hoses. The adhesive supply 136 may optionally heat the liquid adhesive material. The outlet 134 of the heat exchange device 112 is directly coupled with an inlet of the dispensing device 114 and is configured to provide the liquid adhesive material heated in the heat exchange device 112 directly to the dispensing device 114 for dispensing through the dispensing opening 118.

A fluid passageway 140 is defined in the body 130 and connects the inlet 132 and the outlet 134. The heat exchange device 112 is configured to heat the liquid adhesive material flowing through the fluid passageway 140. The fluid passageway 140 includes an inlet section 142, an outlet section 144, and thin slit section 146 between the inlet and outlet sections 142, 144. All of the sections 142, 144, 146 have lengths along a fluid flow direction between the inlet 132 and the outlet 134. Particularly, the inlet section 142 has a length 148, the outlet section 144 has a length 150, and the thin slit section 146 has a length 152.

The body 130 includes a first outer wall 154 and a second outer wall 156 generally opposed from the first outer wall 154. The body 130 also includes a block 158 positioned between and spaced from the first and second outer walls 154, 156. The block 158 includes outer surfaces 160, 162 facing the first and second outer walls 154, 156, respectively.

The body 130 also includes a head 164 generally opposed from a base 166, and the block 158 is positioned generally between the head 164 and the base 166. The inlet 132 and the inlet section 142 of the fluid passageway 140 are generally in the head 164. The outlet 134 and the outlet section 144 of the fluid passageway 140 are generally in the base 166.

Sockets 168 are formed in the block 158 between the outer surfaces 160, 162 for receiving heating elements 170. The heating elements 170 are thereby thermally coupled with the body 130. In the embodiment shown, the block 158 includes two sockets 168 for receiving up to two heating elements 170, although different numbers of sockets and heating elements could also be used. It will be appreciated that other configurations are possible for thermally coupling the heating elements 170 with the body 130.

Like the body 12, the body 130 may be formed of a heat conductive material so that heat generated by the heating elements 170 in the sockets 168 is transferred through the body 130 to the liquid adhesive material flowing through the fluid passageway 140.

The thin slit section 146 of the fluid passageway 140 is defined between the block 158 and at least one of, or both of, the first and second outer walls 154, 156. In particular, a first leg 172 of the thin slit section 146 is defined between the first outer wall 154 and the outer surface 160 of the block 158. A second leg 174 of the thin slit section 146 is defined between the second outer wall 156 and the outer surface 162 of the block 158. The first and second legs 172, 174 represent alternative routes along the fluid passageway 140, and so the thin slit section length 152 is generally equal to the length of either of the first and second legs 172, 174.

A transition section 176 connects the inlet section 142 of the fluid passageway 140 with the first leg 172 of the thin slit section 146. Similarly, a transition section 178 connects the inlet section 142 of the fluid passageway with the second leg 174 of the thin slit section 146. The transition sections 176, 178 are generally positioned within the head 164 of the body 130.

Toward the other end of the body 130, a transition section 180 connects the first leg 172 of the thin slit section 146 with the outlet section 144 of the fluid passageway 140. Similarly, a transition section 182 connects the second leg 174 of the thin slit section 146 with the outlet section 144 of the fluid passageway 140. The transition sections 180, 182 are generally positioned within the base 166 of the body 130.

Flow of liquid adhesive material through the transition sections 176, 178 (into the thin slit section 146) and through the transition sections 180, 182 (out of the thin slit section) may serve to somewhat mix the liquid adhesive material flowing through the fluid passageway 140.

Figure 6:
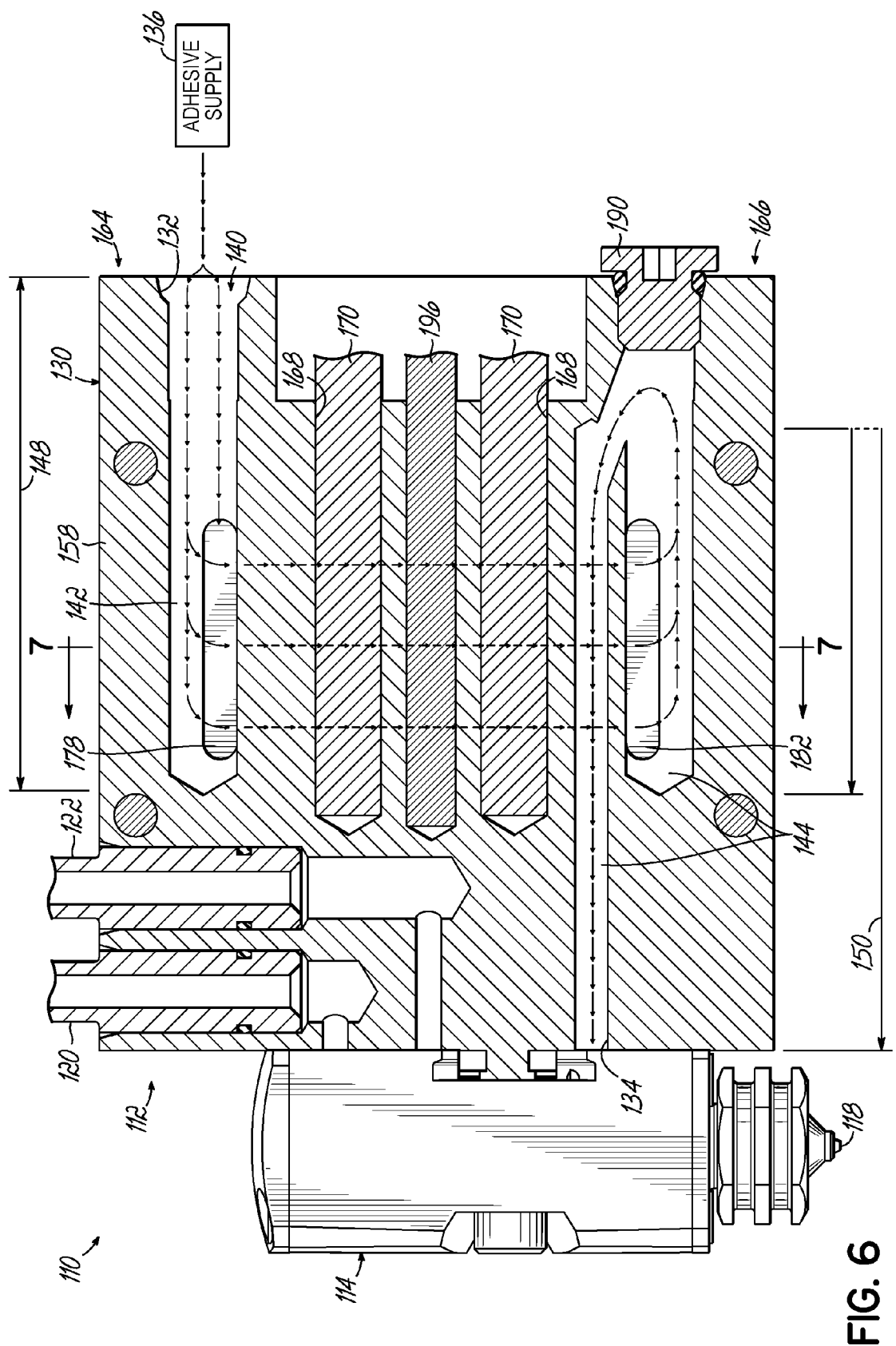

Optionally, and as shown in FIG. 6, the heat exchange device 112 can include a filter 190 for filtering the liquid adhesive material flowing through the fluid passageway 140. The filter 190 is coupled with the outlet section 144 of the fluid passageway 140 for filtering liquid adhesive material flowing therein.

Liquid adhesive material flows through the heat exchange device 112 as follows. First, the liquid adhesive material enters the inlet 132 and flows in the inlet section 142 of the fluid passageway 140 in a fluid flow direction toward the outlet 134. The liquid adhesive material flows from the inlet section 142 through either (1) the transition section 176 into the first leg 172 of the thin slit section 146, or (2) the transition section 178 into the second leg 174 of the thin slit section 146. The liquid adhesive material flows from the first and second legs 172, 174 through the transition sections 180, 182 and into outlet section 144 of the fluid passageway 140. The liquid adhesive material flows in the outlet section 144 and through the filter 190, if included. Finally, the liquid adhesive material flows through the outlet section 144 and exits through the outlet 134 and is directly received in the inlet of the dispensing device 114. The liquid adhesive material is heated as it flows through the fluid passageway 140, including in the thin slit section 146.

The thin slit section 146 of the fluid passageway 140 presents a region in the heat exchange device 112 where a large surface area of the body 130 contacts a relatively small volume of liquid adhesive material. Under such conditions, and as discussed above, heat is quickly and effectively transferred from the body 130 to the liquid adhesive material. In particular, heat transferred from the body 130 spreads across the entire quantity of liquid adhesive material flowing through the first and second legs 172, 174 of the thin slit section 146. Thereby, the liquid adhesive material flowing in the first and second legs 172, 174 is evenly and thoroughly heated. As a consequence, localized and uneven heating of liquid adhesive material is unlikely, and the heat exchange device 112 provides advantageous control over heating liquid adhesive material.

Figure 7:
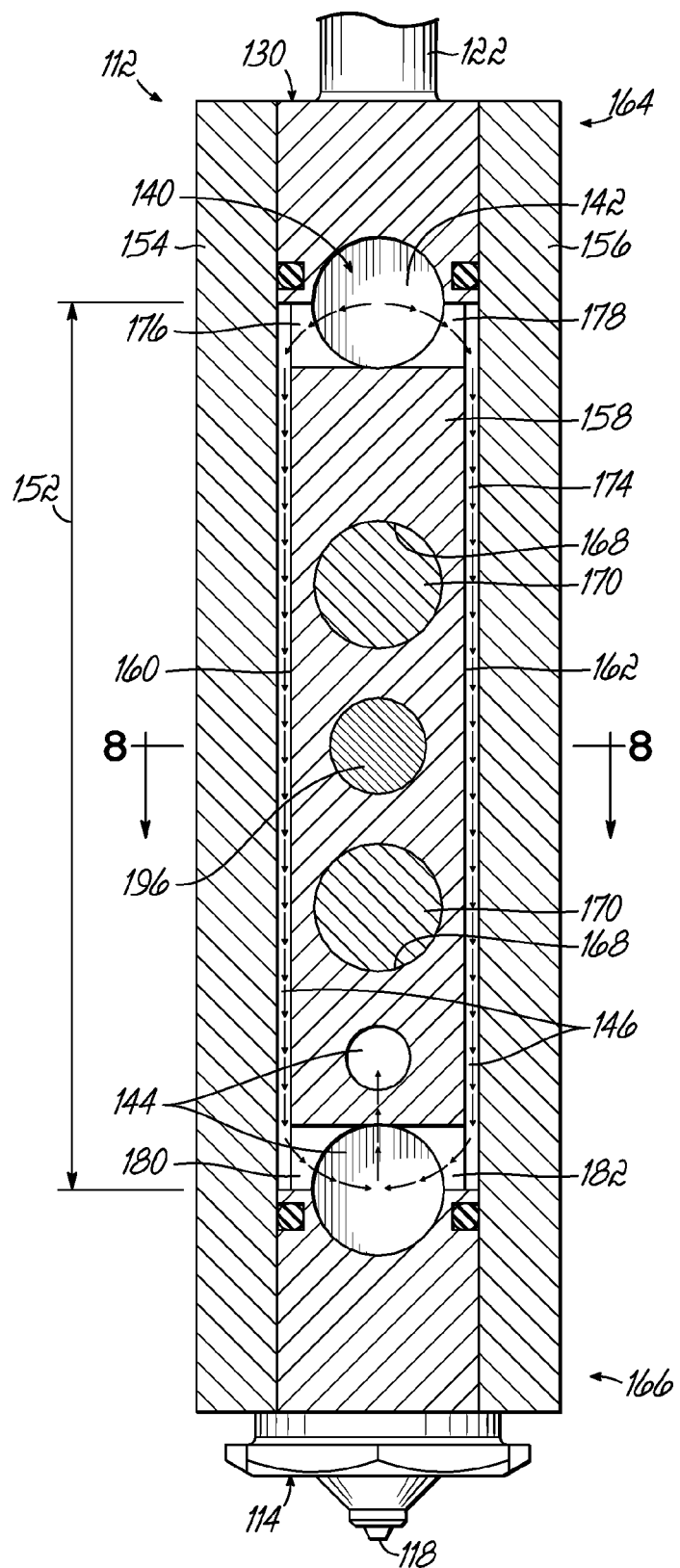
FIG. 7 is a schematic cross sectional view taken along line 7-7 of FIG. 6 and showing interior features of the heat exchange device of FIG. 4, including a thin slit section of the fluid passageway.

As shown in FIGS. 6 and 7, the assembly 110 or the heat exchange device 112 can include a temperature sensor 196 for measuring the temperature of the liquid adhesive material flowing through the fluid passageway 140, and in particular exiting the outlet 134. In the embodiment shown, the temperature sensor 196 is coupled with the body 130 in the block 158 thereof generally between the heating elements 170. Advantageously, the temperature sensor 196 is positioned at a location to measure the temperature of the liquid adhesive material after it has been at least partially heated by the heat exchange device 112. For example, and as shown, the temperature sensor 196 is located near the first and second legs 172, 174 of the thin slit section 146 generally medially between the inlet section 142 and the outlet section 144. Liquid adhesive material is at least partially, if not substantially, heated when it reaches this location. And as discussed above, the thin slit section 146 encourages even and thorough heating of liquid adhesive material flowing through the fluid passageway 140. As a result, a temperature measurement taken by the temperature sensor 196 accurately reflects the temperature of the liquid adhesive material after it has been at least partially heated by the heat exchange device 112. It will be appreciated that the temperature sensor 196 could also be positioned at other suitable locations.

In some embodiments, the temperature sensor 196 is positioned at a location such that the heat exchange device 112 can quickly respond to measured temperature values. Particularly, the temperature sensor 196 can be positioned to measure the temperature of liquid adhesive material flowing in the fluid passageway 140 at a location where (1) the amount of time it takes the liquid adhesive material to flow from that location to the outlet 134 is approximately equal to (2) the amount of time it takes the heat exchange device 112 to change the temperature of the liquid adhesive material flowing in the fluid passageway 140 to the desired temperature.

Figure 8:
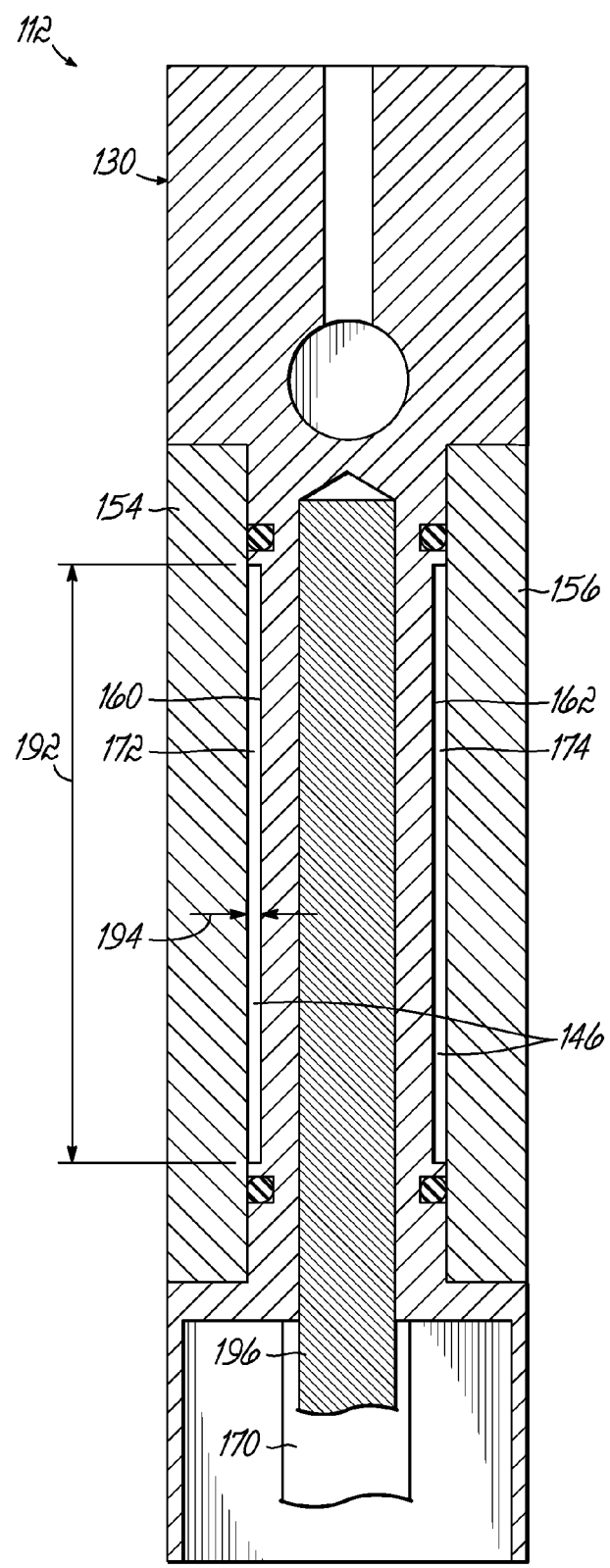
FIG. 8 is a schematic cross sectional view taken along line 8-8 of FIG. 6 and showing interior features of the heat exchange device of FIG. 4, including a thin slit section of the fluid passageway.

Referring to FIG. 8, features of the thin slit section 146 are further described. FIG. 8 shows a cross sectional view transverse to the fluid flow direction in the fluid passageway 140. The block 158 is positioned between, and spaced from, the first and second outer walls 154, 156. The first leg 172 of the thin slit section 146 is defined between the first outer wall 154 and the outer surface 160 of the block 158. The second leg 174 of the thin slit section 146 is defined between the second outer wall 156 and the outer surface 162 of the block 158.

FIG. 8 also shows that the first and second legs 172, 174 of the thin slit section 146 have profiles transverse to the fluid flow direction having quadrilateral shapes. The quadrilateral shapes are generally similar and are characterized by first dimensions 192, which are widths of the quadrilaterals and second dimensions 194, which are thicknesses of the quadrilaterals. The widths 192 of the quadrilateral shapes are substantially greater than the thicknesses 194. In addition, the thin slit section length 152 is substantially greater than the thicknesses 194.

Figure 9:
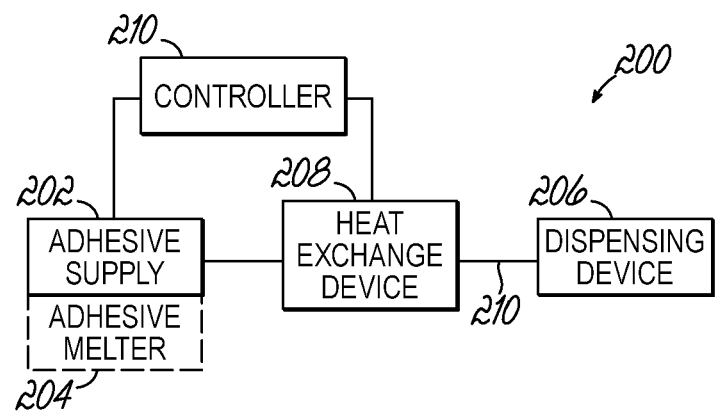
FIG. 9 is a schematic depiction of a liquid adhesive system according to a further embodiment of the invention.
Figure 10:
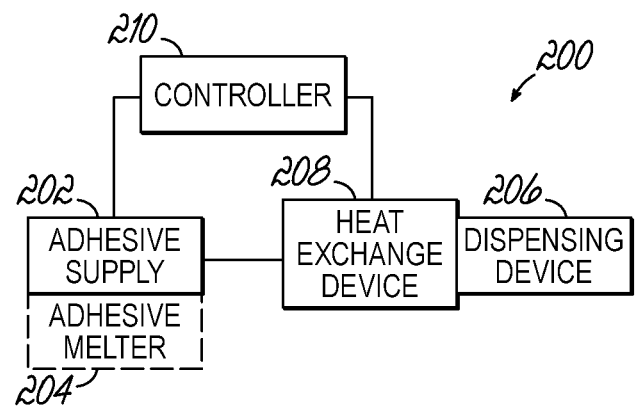
FIG. 10 is a schematic depiction of a liquid adhesive system according to a further embodiment of the invention.

Referring next to FIGS. 9 and 10, liquid adhesive systems 200 generally include an adhesive supply 202, a dispensing device 206, and a heat exchange device 208. The liquid adhesive systems 200 optionally can include an adhesive melter 204, as shown.

The adhesive supply 202 is configured to provide a supply of liquid adhesive material for dispensing by the dispensing device 206. The adhesive melter 204, if present, can be part of the adhesive supply 202, and is configured to melt solid or semi-solid unmelted hot melt adhesive material to form a liquid adhesive material.

The dispensing device 206 is coupled with the adhesive supply 202 through the heat exchange device 208 and is configured for dispensing the liquid adhesive material in an adhesive bonding application. In particular, the heat exchange device 208 is coupled with the adhesive supply 202 (or the adhesive melter 204, as appropriate) and the dispensing device 206. The heat exchange device 208 is configured for heating the liquid adhesive material to an application temperature suitable for the adhesive bonding application. The heat exchange device 208 can be like either of the heat exchange devices 10, 112 discussed above, for example.

If the heat exchange device 208 is like the heat exchange device 10, a heated hose 210 extends between the outlet of the heat exchange device 208 and an inlet of the dispensing device 206, such that liquid adhesive material flows through the heated hose 210 from the heat exchange device 208 to the dispensing device 206, as shown in FIG. 9.

If the heat exchange device 208 is like the heat exchange device 112, the outlet of the heat exchange device 208 is coupled directly with an inlet of the dispensing device 206, such that liquid adhesive material is provided directly from the heat exchange device 208 to the dispensing device 206, as shown in FIG. 10.

The liquid adhesive systems 200 can also include a controller 210. As shown, the controller 210 is operatively coupled with the adhesive supply 202 and the heat exchange device 208. If an adhesive melter 204 is included, the controller 210 can be operatively coupled with the adhesive melter 204. The controller 210 is configured to operate the heat exchange device 208 so as to heat the liquid adhesive material to the application temperature. The controller 210 is also configured to operate the adhesive supply 202 (and the adhesive melter 204, as appropriate) to maintain the liquid adhesive material at a temperature below the application temperature, such that the liquid adhesive material is not suitable for the adhesive bonding application before it is heated to the application temperature in the heat exchange device 208. While controller 210 is depicted as a single controller, it will be appreciated that the controller 210 could include multiple controllers for the adhesive supply 202, the heat exchange device 208, and the adhesive melter 204 for controlling the same as described herein.

In use, the hot melt adhesive systems 200 provide for dispensing liquid adhesive material for an adhesive bonding application. In some embodiments, a supply of solid or semi-solid unmelted hot melt adhesive material is melted by the adhesive melter 204 to form a liquid adhesive material. In these or other embodiments, the supply of solid or semi-solid unmelted hot melt adhesive material may be heated at a temperature less than the application temperature, such as less than 300° F.

The liquid adhesive material is directed from the adhesive supply 202 (or the adhesive melter 204) to the heat exchange device 208. The liquid adhesive material is directed through a thin slit section (28, 146) of a fluid passageway (22, 140) in the heat exchange device 208 (which again, can be like either of the heat exchange devices 10, 112). The liquid adhesive material in the fluid passageway (22, 140) is heated to an application temperature. In some embodiments, especially for liquid adhesive materials created by melting a supply of solid or semi-solid unmelted hot melt adhesive material, the application temperature may be greater than 350° F.

The liquid adhesive material is then directed from the heat exchange device 208 to the dispensing device 206. The dispensing device 206 is then used to dispense the liquid adhesive material for an adhesive bonding application.

If the heat exchange device 208 is like the heat exchange device 10, the liquid adhesive material is directed through the heated hose 210 between the heat exchange device 208 and the dispensing device 206.

The liquid adhesive material at the application temperature is suitable for the adhesive bonding application. The liquid adhesive material is maintained at temperatures below the application temperature, however, before the liquid adhesive material is heated to the application temperature in the heat exchange device 208. Thereby, the liquid adhesive material is not suitable for the adhesive bonding application before it is heated to the application temperature in the heat exchange device. And as discussed above, a controller, such as the controller 210, can be operated to operate the heat exchange device 208 and the adhesive supply 202 (and the adhesive melter 204, if included) such that the liquid adhesive material is heated to the application temperature in the heat exchange device 208, but is maintained at a temperature below the application temperature before it reaches the heat exchange device 208.

Advantageously, by maintaining the liquid adhesive material below the application temperature until it reaches a heat exchange device as disclosed herein, the degradation effects caused by high temperatures on the liquid adhesive material may be avoided. In addition, energy can be conserved by operating the components of the hot melt adhesive system upstream from the heat exchange device (such as the adhesive supply or the adhesive melter) at lower temperatures. Further still, by using thin slit sections in fluid passageways, the heat exchange devices evenly and thoroughly heat the liquid adhesive material flowing through them.

Yet another advantageous embodiment of an assembly defining a liquid adhesive system 300 with a heat exchange device 302 is shown with reference to FIGS. 11 through 16. The liquid adhesive system 300 also includes an adhesive supply 304 (which may include a melter as set forth above), a plurality of dispensing devices 306, and a plurality of control devices 308 for controlling the dispensing devices 306. As shown, the heat exchange device 302 is directly coupled with the dispensing devices 306 in this embodiment, although it will be appreciated that the dispensing devices 306 may be connected with heated hoses to outlet ports of the heat exchange device 302 in other embodiments. The dispensing devices 306 include an internal valve mechanism for controlling the flow of liquid adhesive material out of a dispensing opening 310. The valve mechanism (not shown) of the dispensing devices 306 is operatively coupled with corresponding ones of first and second air conduits 312, 314 of the control devices 308 provided for controlling the operation of the valve mechanism. The dispensing devices 306 may be any known contact or non-contact adhesive dispensing modules or nozzles, while the control devices 308 may be solenoid valves, in one particular example. However, the remainder of the focus in the description of this embodiment is on the heat exchange device 302, which contains a different layout for a fluid passageway 316 extending therein.

Figure 11:
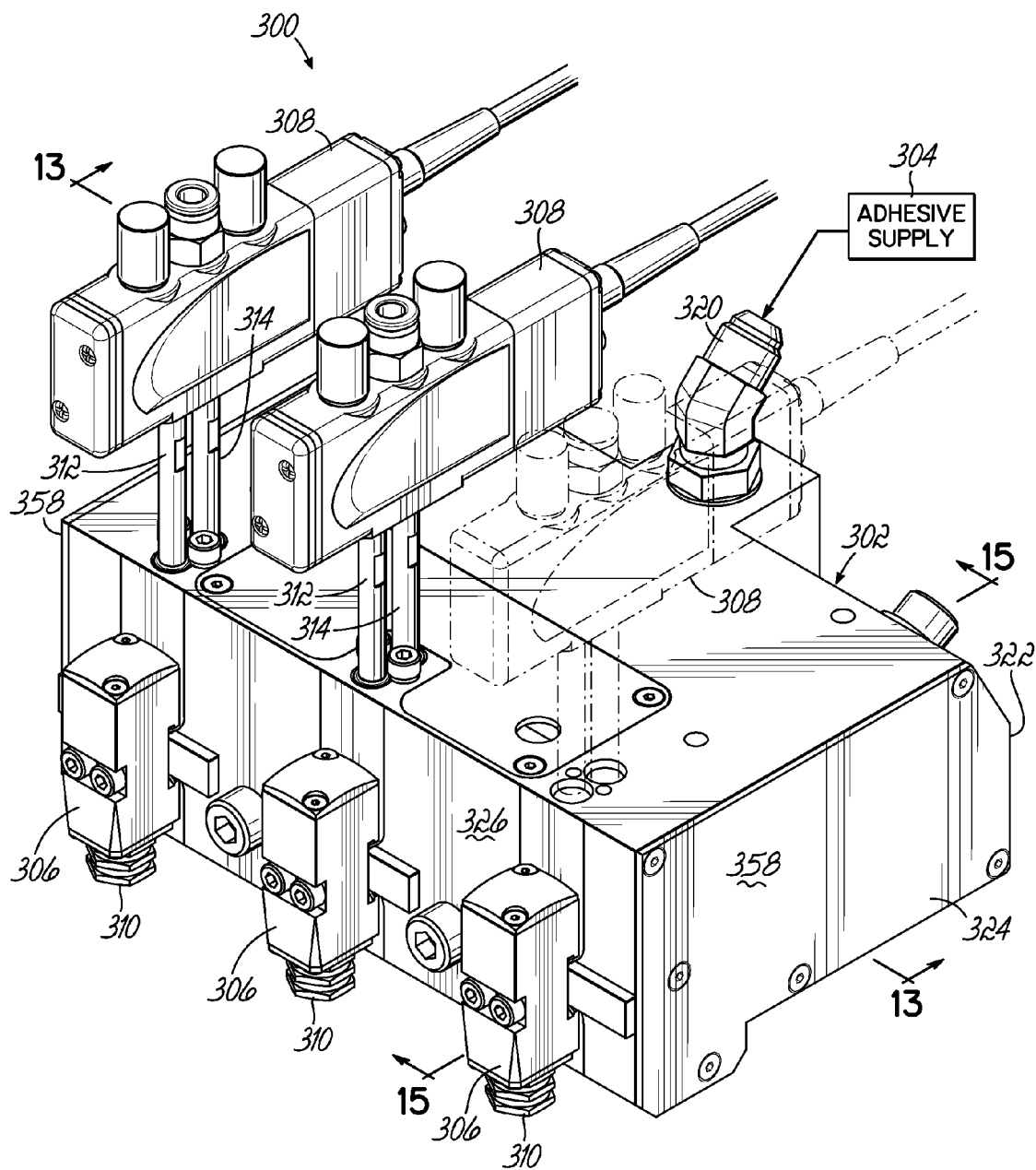
FIG. 11 is an isometric view showing an assembly constructed according to yet another embodiment of the invention and including a heat exchange device, a plurality of dispensing devices, and a plurality of control devices for controlling the dispensing devices. The heat exchange device is configured to heat liquid adhesive material to an application temperature suitable for an adhesive bonding application.

In FIG. 11, one of the control devices 308 is shown in phantom so that the inlet 320 located along adjacent a back side 322 of a body 324 is visible. The fluid passageway 316 referred to briefly above and in detail below connects the inlet 320 to several outlets, which are covered by the dispensing devices 306 shown in FIG. 11. The outlets are provided along a front side 326 of the body 324, this front side 326 also being where the dispensing devices 306 are mounted, such as with threaded fasteners as shown. The body 324 is a generally metallic or otherwise heat conductive block of material having various bores and passageways located therein for the purposes of providing flow paths for liquid adhesive material and sockets for heating elements used to heat the liquid adhesive material flowing through the fluid passageway 316. Several removable plates and fasteners are shown along the outer periphery of the body 324 in FIG. 11, but these elements are not described in further detail herein except where relevant to the functionality of the heat exchange device 302 in accordance with the aspects of the disclosed invention.

Figure 12:
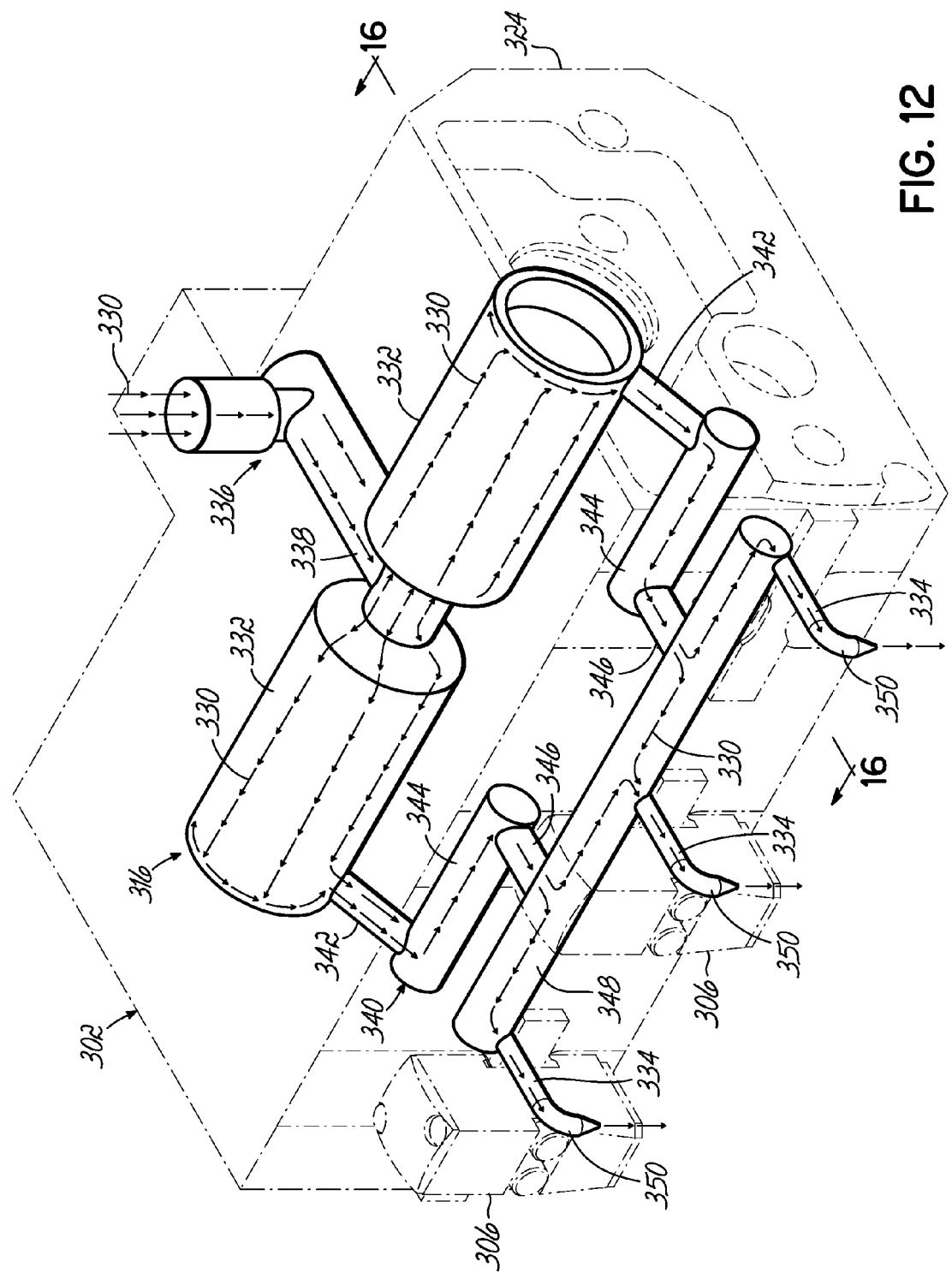
FIG. 12 is a perspective view of the heat exchange device of FIG. 11, with a body of the heat exchange device shown in phantom so as to reveal the fluid passageway through the heat exchange device, and flow arrows being shown to indicate liquid adhesive material movement through the fluid passageway.

Turning to FIG. 12, the fluid passageway 316 is shown in further detail in solid form within a phantom version of the body 324 of the heat exchange device 302. FIG. 12 provides a general overview of the liquid adhesive material flow through the heat exchange device 302, this flow being indicated by arrows 330. Just like previously-described embodiments, the fluid passageway 316 of this embodiment includes a thin slit section 332 communicating with the inlet 320 and the outlets 334, which are generally visible in this view. More specifically, the fluid passageway 316 includes two thin slit sections 332 because the liquid adhesive material flow is divided and recombined within the fluid passageway 316 for reasons set forth in further detail below. The fluid passageway 316 also includes an inlet section 336 including a T-shaped inlet passage 338 that extends and communicates between the inlet 320 and the thin slit sections 332. The fluid passageway 316 also includes an outlet section 340 which communicates between the thin slit sections 332 and the outlets 334. To this end, the outlet section 340 of this embodiment specifically includes two first outlet bores 342 extending radially outward from the ring-shaped thin slit sections 332, two second outlet bores 344 connected to and extending transversely from the first outlet bores 342, two third outlet bores 346 connected to and extending transversely from each of the second outlet bores 344, and a fourth outlet bore 348 communicating with and extending transversely from each of the third outlet bores 346. The fourth outlet bore 348 also communicates with each of the outlets 334 (and internal passages 350 of the dispensing devices 306). Each of these elements is described in further detail below with reference to several cross sectional views of the heat exchange device 302.

Figure 13:
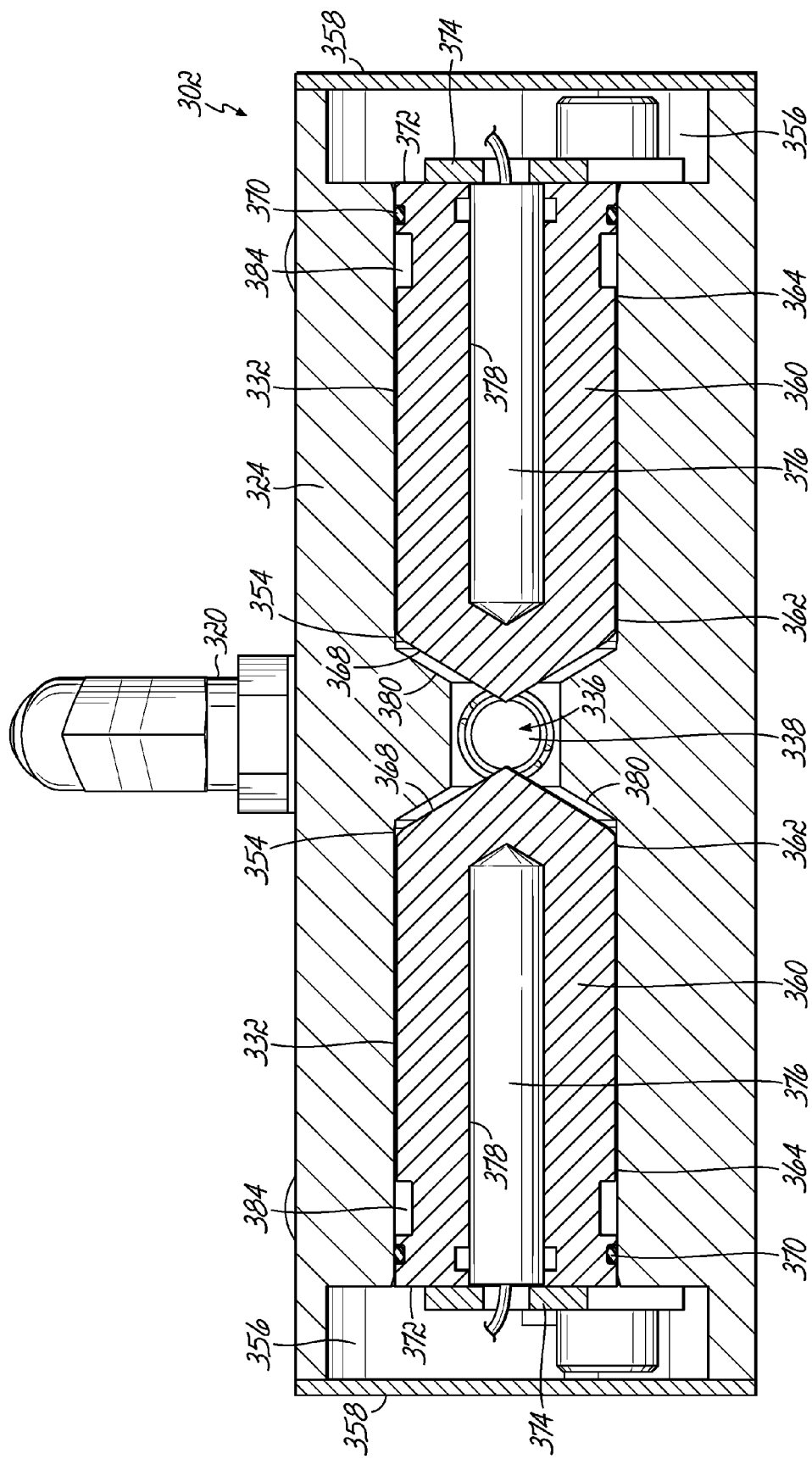
FIG. 13 is a front cross sectional view through the heat exchange device of FIG. 11, taken along line 13-13 in FIG. 11, illustrating details of the fluid passageway along a thin slit section defined between a generally cylindrical socket and an interior body member.
Figure 14:
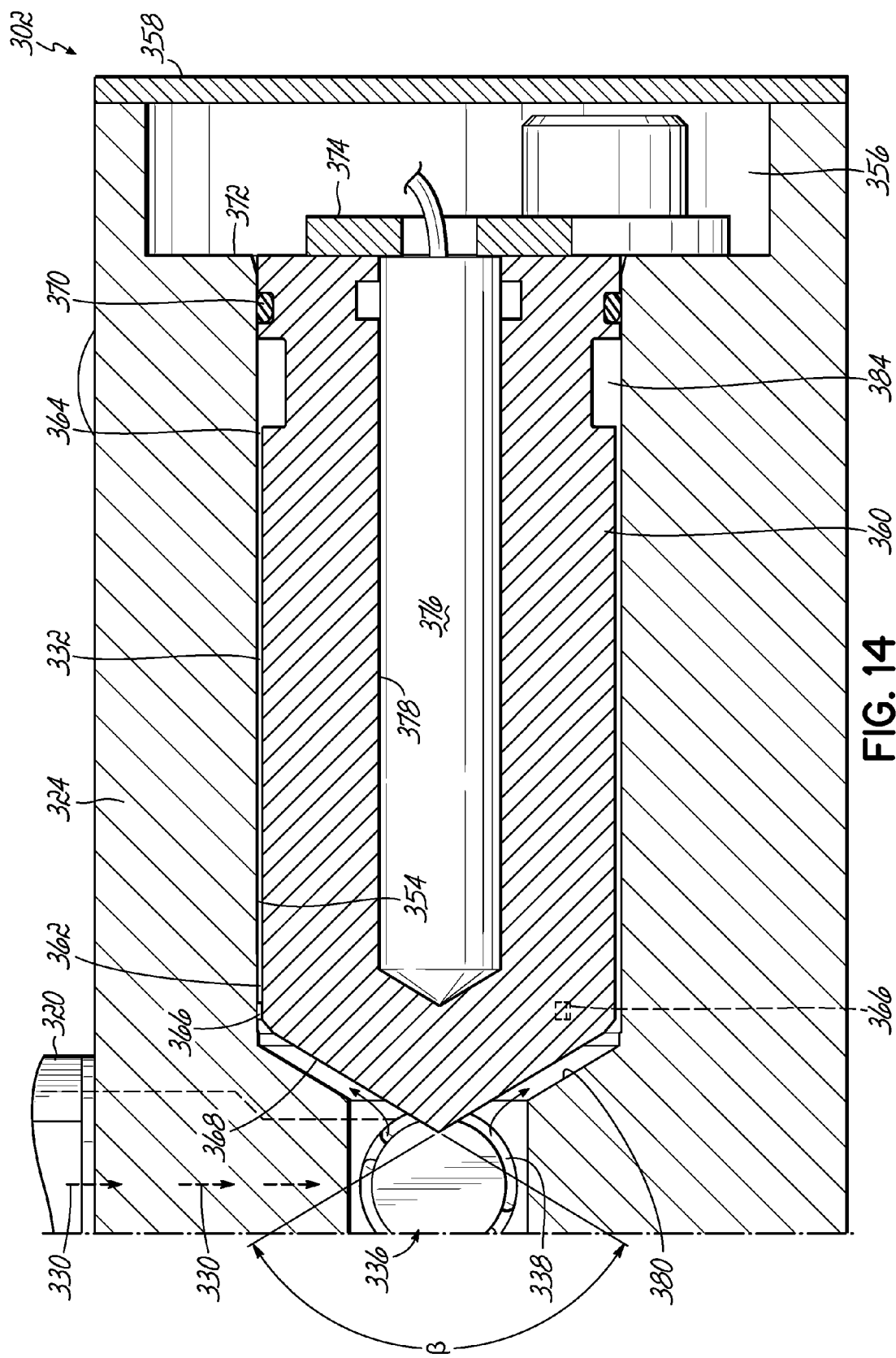
FIG. 14 is a detailed front cross sectional view, taken along line 13-13 in FIG. 11, of one of the thin slit sections shown in FIG. 13.

Turning with reference to FIGS. 13 and 14, a lateral cross section through the center of the structures defining the thin slit sections 332 is shown, thereby revealing the longitudinal length and radial thickness of the thin slit sections 332. In this regard, the T-shaped inlet passage 338 terminates along this same cross section where it communicates with two generally cylindrical sockets 354 extending in opposite directions away from the inlet passage 338. Each of the generally cylindrical sockets 354 defines a longitudinal length between the inlet passage 338 and an access space 356 located adjacent a removable sidewall 358 of the body 324. The heat exchange device 302 also includes interior body members 360 which are inserted within the generally cylindrical sockets 354 and extend along a substantial majority of the longitudinal length thereof. The outer diameter of the interior body members 360 is slightly smaller than the inner diameter defined by the generally cylindrical sockets 354, thereby leaving an annular or ring-shaped gap extending along the length of these elements, and this annular gap is the thin slit section 332 of the fluid passageway 316. Thus, the liquid adhesive material flowing into the heat exchange device 302 at the inlet 320 flows through the inlet passage 338 and then divides into partial adhesive flow portions, which then move through the thin slit sections 332. As described further below (and above for previous embodiments including thin slit sections), the liquid adhesive material is efficiently heated during passage through these thin slit sections 332 to the application temperature suitable for the adhesive bonding application.

When assembling the heat exchange device 302, it is important to keep each of the interior body members 360 centered within the corresponding generally cylindrical sockets 354. Accordingly, the interior body member 360 includes or is associated with additional elements adjacent to a first end 362 of the thin slit sections 332 (e.g., the end that communicates with the inlet passage 338) and adjacent to a second end 364 of the thin slit sections 332 (e.g., the end that is closest to the access space 356). More specifically, the interior body members 360 each include a plurality of projections 366 which project radially outwardly from the interior body members 360 at or near conical ends 368 of the interior body members 360 facing towards the inlet passage 338. In the specific example shown in these Figures, the plurality of projections 366 includes three nub-like projections 366 equally spaced around the circumference of the interior body members 360. Gaps for flow of the liquid adhesive material are defined between the projections 366, and it will be appreciated that the projections 366 do not significantly affect the flow of the liquid adhesive material into the first ends 362 of the thin slit sections 332. More or fewer radial outward projections 366 may be provided in other embodiments of the heat exchange device 302, so long as the functionality of engaging the generally cylindrical sockets 354 to center the interior body members 360 is retained.

Moreover, the interior body members 360 carry an O-ring or ring shaped seal member 370 adjacent the second ends 364 of the thin slit sections 332. The ring shaped seal members 370 block the liquid adhesive material from flowing out of the thin slit sections 332 into the corresponding access spaces 356, and this sealing function together with the tight tolerance of the generally cylindrical socket 354 to the interior body member 360 in this area also inherently centers the interior body members 360 at this end within the generally cylindrical sockets 354. Therefore, the plurality of projections 366 adjacent the conical ends 368 and the ring shaped seal members 370 adjacent opposite terminal ends 372 of the interior body members 360 ensure that the annular gap remains consistent along the longitudinal length of the generally cylindrical sockets 354 and of the interior body members 360. This arrangement encourages even flow of the liquid adhesive material through the ring shape of the thin slit sections 332.

The interior body members 360 are held within the generally cylindrical sockets 354 in the longitudinal length direction by end caps 374 which engage the terminal ends 372 of the interior body members 360 at the access spaces 356. The end caps 374 are typically secured to the remainder of the body 324 with one or more fasteners, such as threaded fasteners. In this embodiment shown in FIGS. 13 and 14, the end caps 374 also include an opening for wiring of an interior heating element 376 (also referred to as second heater elements) which is inserted into each of the interior body members 360. To this end, each of the interior body members 360 is hollowed along a partial portion of the longitudinal length to provide a heater bore 378 which receives the interior heating element 376. This interior heating element 376 applies heat energy to the interior body members 360, thereby applying the heat energy from a radial inward direction to the liquid adhesive material flowing through the thin slit sections 332. As described below, alternative methods of providing heat energy to the interior body members 360 is also possible without departing from the scope of the invention.

Consequently, in order to assemble the thin slit sections 332 within the body 324, each of the interior body members 360 is inserted into the open ends of the generally cylindrical sockets 354 at the access spaces 356. The plurality of projections 366 may also serve an additional purpose during this assembly, that being engagement with conical transitions 380 formed in the body 324 to connect the inlet passage 338 to the corresponding generally cylindrical socket 354, which is larger than the inlet passage 338 in size. This engagement between the plurality of projections 366 and the conical transitions 380 bottoms out the interior body members 360 while leaving a gap for flow between the conical transitions 380 and the conical ends 368. Once the interior body members 360 are inserted to this depth along the longitudinal length of the generally cylindrical sockets 354, the end caps 374 are secured into position over the terminal ends 372 to lock the interior body members 360 in position within the generally cylindrical sockets 354. In this final position, the plurality of projections 366 and the ring shaped seal member 370 maintain the centered alignment of the interior body members 360 and the generally cylindrical sockets 354. It can be verified from this perspective that the longitudinal length of the thin slit sections 332 is substantially greater in size than the radial thickness defined by the thin slit sections 332. As a result, a generally thin curtain of liquid adhesive material that is ideal for heating is flowing through the thin slit sections 332.

With continued reference to FIGS. 13 and 14, further details of the interior body members 360 are shown. For example, the corresponding shapes of features at the interior body members 360 and at the generally cylindrical sockets 354 enable guided flow of the liquid adhesive material in a desirable manner. In this regard, the conical ends 368 facing towards the conical transitions 380 have been briefly described above, and the plurality of projections 366 are also configured to ensure a gap remains between the conical ends 368 and the conical transitions 380. This gap is sized and shaped to guide the incoming flow of liquid adhesive material in such a manner that it equally spreads around a circumference of the interior body member 360 without allowing for any areas of flow stagnation to develop near the first end 362 of the thin slit section 332. The conical ends 368 define an angle of cone expansion $\beta$ as shown in FIG. 14, and this angle is an obtuse angle. The obtuse angle of the conical ends 368 in one particular example may be 118 degrees. That type of obtuse angle cone expansion forces the incoming flow of liquid adhesive material to rapidly shift outwardly from the inlet passage 338 to the thin slit section 332. Once again, this arrangement guides the flow going into the thin slit sections 332 so as to avoid formation of any areas of stagnation.

At the opposite second ends 364 of the thin slit sections 332, the interior body members 360 also include a ring-shaped channel 384 which is positioned adjacent to the ring shaped seal member 370. The ring shaped channel 384 is an annular groove cut into the outer periphery or circumference of the interior body members 360, which in combination with the already-existing annular gap at the second ends 364 of the thin slit sections 332, provides a larger annular area for collecting the liquid adhesive material flowing out of the thin slit sections 332. Moreover, the ring shaped channels 384 guide this outgoing flow of liquid adhesive material towards the outlet section 340 so as to once again avoid the formation of any areas of flow stagnation which could lead to char in the adhesive. The larger size of this ring shaped channel 384 compared to the thin slit section 332 is also revealed in the two similar side cross sectional views provided in FIGS. 15 and 16.

Figure 15:
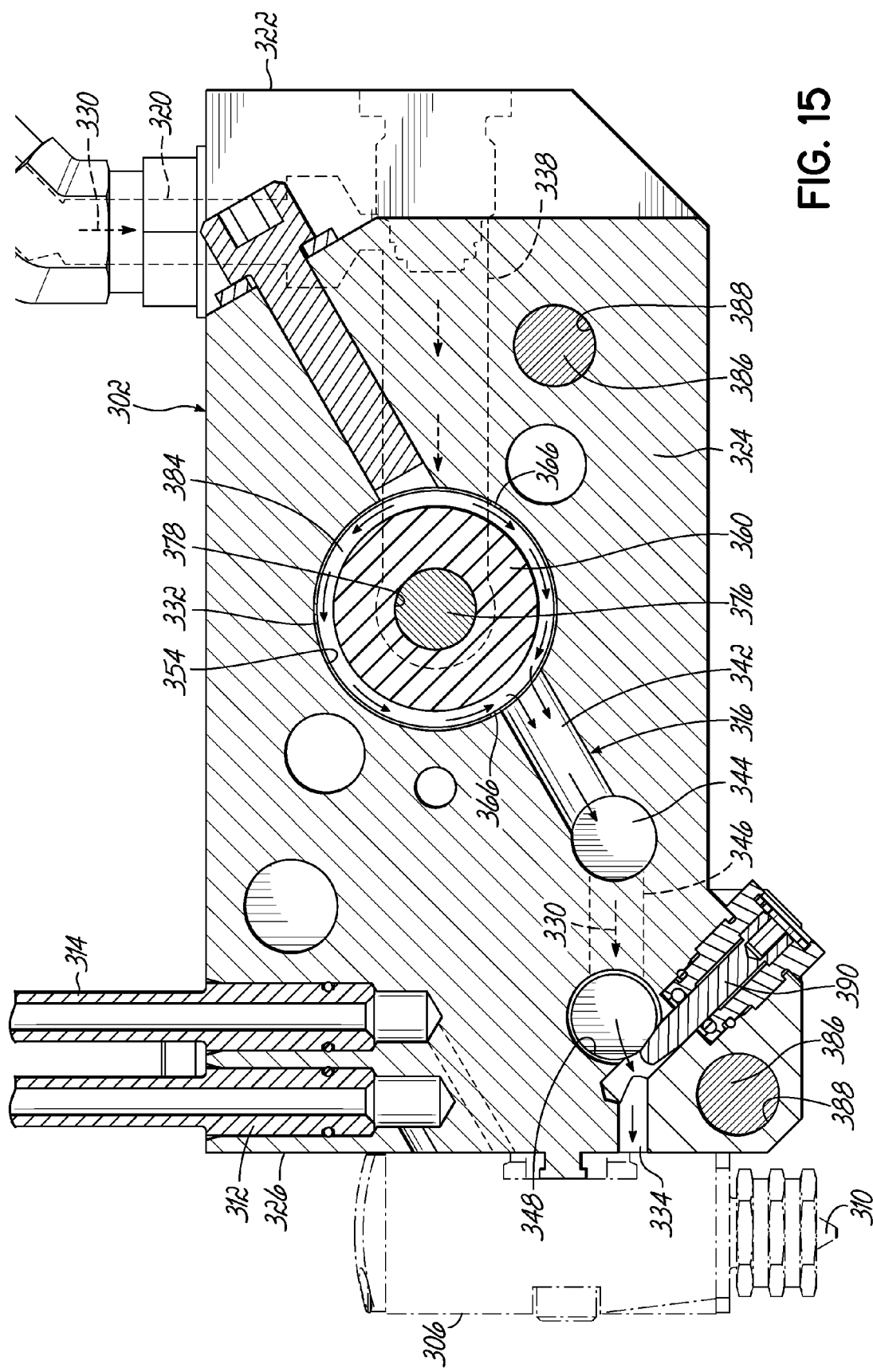
FIG. 15 is a side cross sectional view through the heat exchange device of FIG. 11, taken along line 15-15 in FIG. 11, illustrating details of the fluid passageway, including a ring-shaped channel provided at a second end of the thin slit section.
Figure 16:
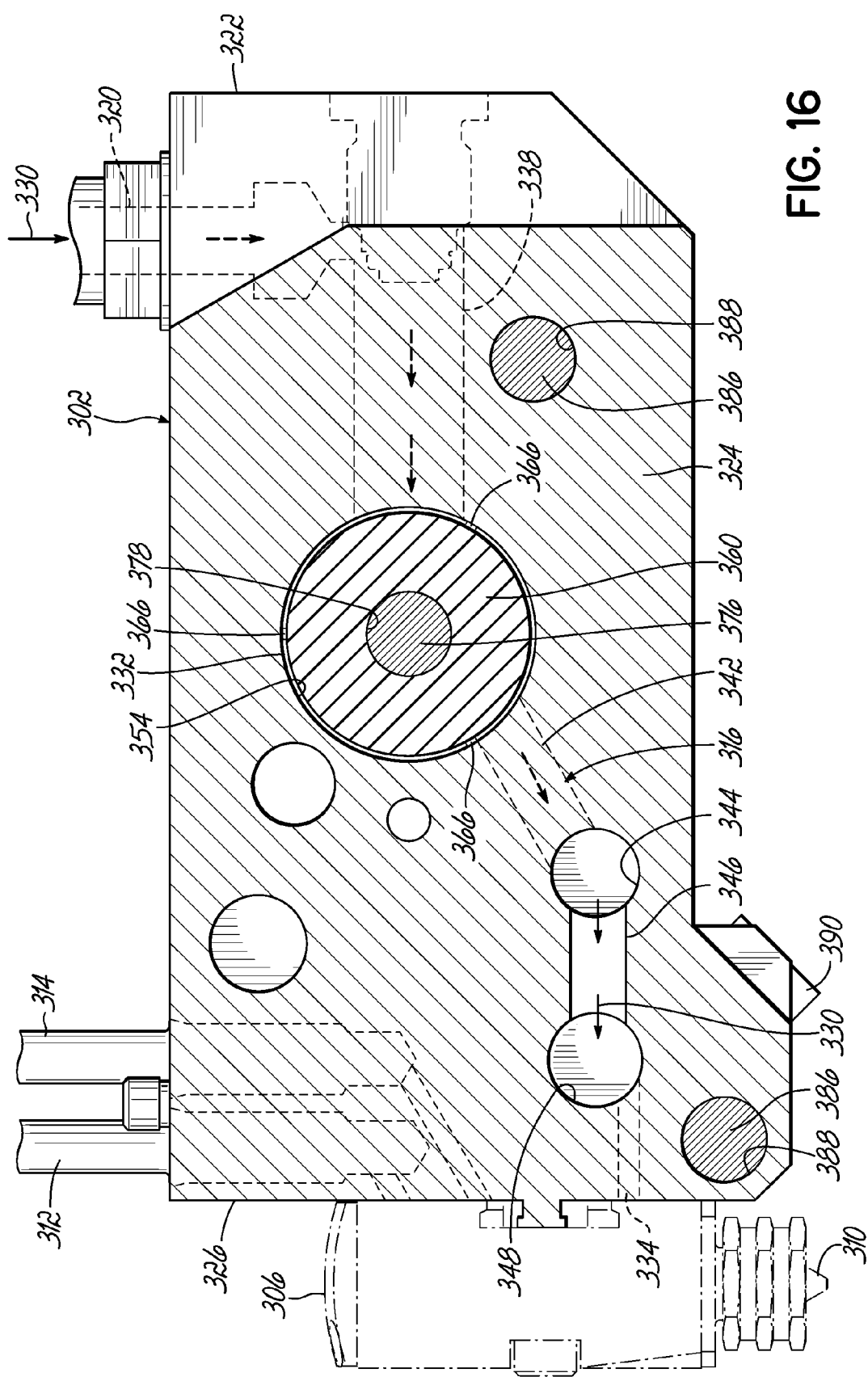
FIG. 16 is a side cross sectional view through the heat exchange device of FIG. 11, taken along line 16-16 in FIG. 12, illustrating details of the fluid passageway, including a ring profile of the thin slit section.

As shown specifically in FIG. 16, the ring shape profile of the thin slit section 332 is shown by the cross section taken transverse to the flow direction. This ring shape profile also reveals that the circumference dimension of the thin slit section 332 is substantially greater than the radial thickness through the thin slit section 332. With heat energy being applied radially inwardly and radially outwardly into this substantially lesser dimension of the radial thickness, the liquid adhesive material flowing through the thin slit section 332 is efficiently and effectively heated to the desired application temperature. This transfer of heat energy into the thin slit section 332 in this embodiment comes both from the interior heating elements 376 shown again within the interior body members 360 and also from heat energy produced by body heating elements 386 positioned within corresponding heater bores 388 or sockets provided along the longitudinal length of the body 324. In the particular embodiment shown in FIGS. 15 and 16, the body heating elements 386 (also referred to as first heater elements) are located with one proximate the back side 322 and the inlet passage 338, and another proximate the front side 326 and the outlets 334. It will be understood that more or fewer heating elements may be provided in other embodiments, particularly where the ambient temperature heat loss at the body 324 varies.

With reference to this heat loss experienced by convection away from the outer periphery of the body 324, the body heating elements 386 must typically apply more heat energy to maintain the entirety of the body 324 at a desired temperature while also compensating for this heat loss. By comparison, the interior heating elements 376 effectively apply nearly all heat energy produced to the thin slit sections 332 and the adhesive, so these interior heating elements 376 do not need to be operated at a higher power level to compensate for heat losses while providing consistent heating energy to the liquid adhesive material. In one exemplary embodiment, the body heating elements 386 are operated at twice the power level and heat energy output (e.g., at 200 Watts) than the interior heating elements 376 (e.g., functioning at 100 Watts). This type of operation is controlled by a controller as described in association with the previous embodiments, the controller receiving signals from one or more temperature sensors at the heat exchange device 302 to ensure that the various heating elements work to heat up the liquid adhesive material to the desired application temperature and then maintain this temperature through delivery to the dispensing devices 306. One such temperature sensor 390 is shown adjacent one of the outlets 334 at FIG. 15, for example. As described in detail above, the temperature sensor(s) 390 may be advantageously located to accurately confirm the liquid adhesive material is being held at the desired application temperature. It will be appreciated that other similar types of heating elements like heater cartridges and other types of temperature sensors or probes may be used without departing from the scope of this disclosure.

After flowing through the thin slit sections 332, the liquid adhesive material collects within the ring shaped channels 384 and flows as shown by the flow arrows 330 in FIG. 15 towards the corresponding first outlet bores 342. These first outlet bores 342 feed the partial adhesive flows into the corresponding second outlet bores 344 as shown by FIG. 15, which extend transverse to the first outlet bores 342 and transverse to the plane of the cross section taken in FIG. 15. The fluid pressure in the heat exchange device 302 creates forces on the surrounding surfaces, some of which are quite large, to enable the heat exchange functionality. The tendency to force components of the heat exchange device 302 apart as in other designs is minimized as the majority of the surfaces that the fluid pressure acts on are in the body 324, which is made from a single piece of material, and are balanced in a radial direction. The annular shape of the thin slit sections 332 is also configured to balance out fluid pressure forces that would act on the interior body members 360 and could lead to movement of parts and leakage, for example. To this end, the fluid pressure forces inherent in the liquid adhesive material only push outwardly against the conical ends 368 and the ring shaped seal members 370, but the seal members 370 and the end caps 374 are configured to handle such a fluid pressure load.

After flowing towards the center of the body 324 in the second outlet bores 344, the partial adhesive flows enter the corresponding third outlet bores 346 which extend transverse to the second outlet bores 344. The flow through these third outlet bores 346 is shown by flow arrows 330 in FIG. 16, for example. Both of these third outlet bores 346 then feed the corresponding partial adhesive flows into the fourth outlet bore 348, which extends across the entire width of the body 324 in the embodiment shown. The outlets 334 are positioned at opposite lateral ends of the fourth outlet bore 348 as well as in the center thereof, and the third outlet bores 346 are configured to feed the partial adhesive flows into the fourth outlet bore 348 at locations between these connections to the outlets 334. As a result, the partial adhesive flows divide again upon entry into the fourth outlet bore 348 so as to flow to the two closest outlets 334 (although it is also true that the partial adhesive flows are effectively "recombined" into the entire liquid adhesive material flow at the fourth outlet bore 348). This arrangement effectively balances the backpressure applied to the liquid adhesive material as it flows to each of the three dispensing devices 306. In other words, the backpressure or pressure loss is the same for each of the flow paths between the inlet 320 and the outlets 334. Furthermore, the arrangement of general dividing, recombining, and back-and-forth flow through the fluid passageway 316 in the body 324 enables a highly compact body 324 to be used for the heating effect to be applied to the liquid adhesive material. This compact body 324 is also inherently more energy efficient because less heat loss to the environment is encountered, and less metallic material needs to be held at temperature during heating of the liquid adhesive material within the heat exchange device 302.

Thus, in operation, the heat exchange device 302 functions as one element in the liquid adhesive system 300, which is effectively controlled by a controller as set forth above. To this end, a melter at the adhesive supply 304 melts solid or semi-solid particles of adhesive to produce the liquid adhesive material, which is then delivered into the heat exchange device 302 at a temperature below the application temperature. For example, the incoming liquid adhesive material at the inlet 320 may have a temperature of about 170 degrees Celsius. The liquid adhesive material begins heating up within the inlet section 336, although the majority of the heating occurs within the thin slit sections 332 as a result of the narrowed adhesive profile moving through these thin slit sections 332 (thereby enabling more uniform and quick heating up of the liquid adhesive material). Upon exit from the thin slit sections 332, the liquid adhesive material has been heated to about 215 degrees Celsius, for example. This temperature is then largely maintained during flow through the outlet section 340, such that the liquid adhesive material is delivered into the dispensing devices 306 at the desired application temperature for the adhesive bonding application. As with other designs described above, the liquid adhesive system 300 and heat exchange device 302 of this embodiment provides minimal pressure drop in the liquid adhesive material and efficient heating in a compact design, which is more energy efficient and responsive to temperature-sensor based controls than prior heat exchanger designs.

Figure 17:
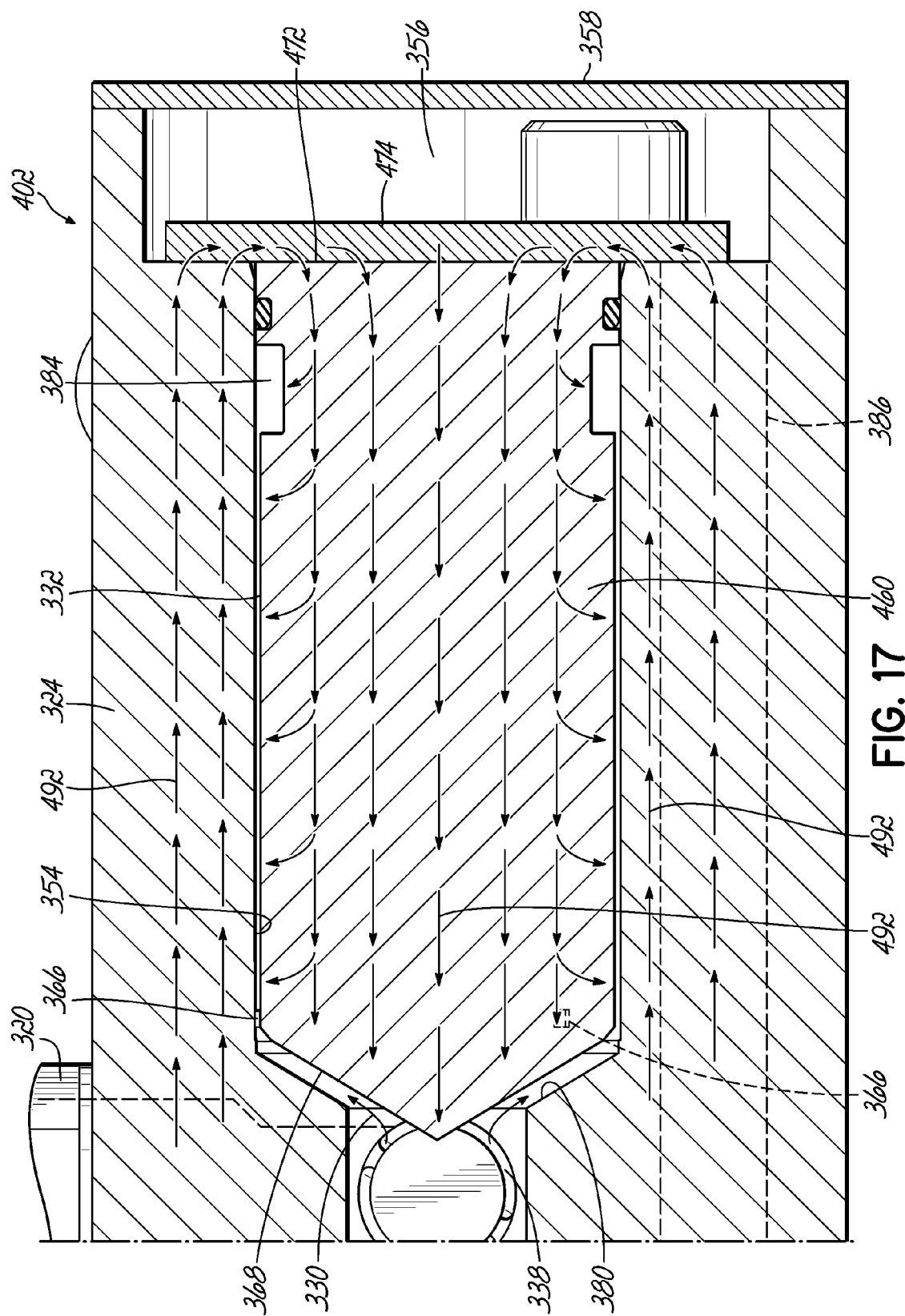
FIG. 17 is a front cross sectional view through an alternative embodiment of the heat exchange device of FIG. 11, including heat flow arrows showing heat transfer from the body through an end cap and into the interior body member so that the thin slit section is heated from radial inward and radial outward directions.

With reference to FIG. 17, a slightly modified embodiment of the heat exchange device 402 is shown. In this embodiment, all components described with the previous embodiment are the same except as described below, and the same reference numbers have been used to refer to identical elements. To this end, the interior body member 460 of this embodiment is modified to be a solid member rather than a hollow member receiving an interior heating element. The end cap 474 retaining the interior body member 460 in position within the generally cylindrical socket 354 is modified to engage with a larger surface area of the body 324 at the access space 356 and with the terminal end 472 of the interior body member 460. As a result, the end cap 474, which may be formed from metallic or some other heat conductive material, transfers heat energy from the body 324 into the interior body member 460 as shown by heat arrows 492 in FIG. 17. Accordingly, even without providing an interior heating element, the thin slit section 332 is heated from both the radial inward and radial outward directions, providing the same functional benefits discussed above with reference to the previous embodiment. It will be understood that the design of the interior body member 460 or other components may be modified in other similar embodiments, such as for example by being hollow (yet still unfilled by an interior heating element).

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A heat exchange device for heating liquid adhesive material to an application temperature suitable for an adhesive bonding application, the heat exchange device comprising:
    a body having an inlet configured to receive a flow of liquid adhesive material and an outlet configured to provide the liquid adhesive material to a dispensing device for the adhesive bonding application, the body comprising a generally cylindrical socket having a longitudinal length;
    a fluid passageway defined in said body fluidly connecting said inlet and said outlet, said fluid passageway including a thin slit section having a length along a fluid flow direction between said inlet and said outlet, a profile of said thin slit section being a continuous ring, said thin slit section having a circumference of the ring and a radial thickness of the ring transverse to the fluid flow direction, the circumference of the ring and the length being substantially greater than the radial thickness of the ring;
    an interior body member extending within said generally cylindrical socket and along the longitudinal length to define said thin slit section at an annular gap located between said generally cylindrical socket and said interior body member, said interior body member including a plurality of projections extending radially outwardly into contact with said generally cylindrical socket, with gaps for flow of liquid adhesive material into said thin slit section located between said plurality of projections; and
    at least one heating element thermally coupled with said body and configured to heat the liquid adhesive material flowing through said fluid passageway to the application temperature.

2. The heat exchange device of claim 1, wherein said at least one heating element providing heat energy to said thin slit section from a radially inward direction via said interior body member and also from a radially outward direction via said body at said generally cylindrical socket.

3. The heat exchange device of claim 2, wherein said at least one heating element further comprises:
    at least one first heater element extending through at least one heater bore in said body and heating said body to heat said generally cylindrical socket and a remainder of said fluid passageway, thereby heating the liquid adhesive material flowing therein; and
    a second heater element extending inside said interior body member and heating said interior body member to heat the liquid adhesive material flowing in said thin slit section.

4. The heat exchange device of claim 3, wherein said second heater element operates at a lower power level and lower heat energy output than said at least one first heater element.

5. The heat exchange device of claim 3, wherein said fluid passageway further includes an inlet section between said inlet and said thin slit section and an outlet section between said thin slit section and said outlet, and said at least one first heater element is positioned within said body to heat the liquid adhesive material during flow through said inlet section, said generally cylindrical socket, and said outlet section.

6. The heat exchange device of claim 3, further comprising:
    an end cap fastened to the body and maintaining the interior body member in position within the generally cylindrical socket, the end cap transferring heat energy from the body to the interior body member to enable the provision of heat energy into the thin slit section from the radially inward direction and the radially outward direction.

7. The heat exchange device of claim 2, wherein said thin slit section includes a first end communicating with said inlet and a second end communicating with said outlet, said plurality of projections are disposed adjacent said first end, and said interior body member includes a ring-shaped seal member adjacent said second end of said thin slit section, said plurality of projections and said ring-shaped seal member configured to maintain said interior body member centered within said generally cylindrical socket.

8. The heat exchange device of claim 7, wherein said plurality of projections includes at least three projections.

9. The heat exchange device of claim 7, wherein said interior body member defines a conical end adjacent said first end of said thin slit section, and said fluid passageway includes a conical transition into said generally cylindrical socket adjacent said conical end, said conical transition and said conical end guiding flow of the liquid adhesive material into said thin slit section to avoid developing areas of flow stagnation within said fluid passageway.

10. The heat exchange device of claim 9, wherein said conical end of said interior body member defines an obtuse angle of cone expansion which rapidly forces the flow of liquid adhesive material into said thin slit section.

11. The heat exchange device of claim 7, wherein said interior body member further includes a ring-shaped channel located adjacent said second end of said thin slit section, said ring-shaped channel guiding flow of the liquid adhesive material out of said thin slit section to avoid developing areas of flow stagnation within said fluid passageway.

12. The heat exchange device of claim 2, wherein said body being connected to at least three dispensing devices for the adhesive bonding application, and said fluid passageway further comprises:
    an inlet section including at least one inlet passage that divides the flow of liquid adhesive material into partial adhesive flow portions;
    two of said thin slit sections, which are formed between two corresponding interior body members extending within two generally cylindrical sockets in said body, each of said thin slit sections receiving one of the partial adhesive flow portions; and
    an outlet section including at least one outlet bore that recombines the partial adhesive flow portions for delivery to each of the at least three dispensing devices.

13. The heat exchange device of claim 12, wherein:
    said at least one inlet passage includes a T-shaped passage extending between said inlet and said generally cylindrical sockets, and
    said at least one outlet bore further includes two first outlet bores extending radially from said generally cylindrical sockets to receive flow from said thin slit sections, two second outlet bores connected to and extending transversely from said first outlet bores towards one another, two third outlet bores connected to and extending transversely from said second outlet bores, and a fourth outlet bore communicating with and extending transversely from each of said third outlet bores and also communicating with the at least three dispensing devices.

14. A method of dispensing liquid adhesive material for an adhesive bonding application, the method comprising:
   directing liquid adhesive material from an adhesive supply to a heat exchange device and through a fluid passageway in the heat exchange device, such that the liquid adhesive material flows through a thin slit section of the fluid passageway defined between an interior body member and a generally cylindrical socket in a body of the heat exchange device, the thin slit section including a length along a fluid flow direction, a first ring-shaped circumference dimension transverse to the fluid flow direction, and a second radial thickness dimension transverse to the fluid flow direction which is substantially lesser than the length and the first ring-shaped circumference dimension, wherein the interior body member includes a plurality of projections extending radially outward into contact with said generally cylindrical socket, with gaps for flow of liquid adhesive material into said thin slit section located between said plurality of projections;
   heating the liquid adhesive material in the thin slit section of the heat exchange device to an application temperature suitable for the adhesive bonding application, by applying heat energy to the thin slit section from a radially inward direction at the interior body member and from a radially outward direction at the generally cylindrical socket, the liquid adhesive material being maintained at temperatures below the application temperature before being heated in the heat exchange device;
   directing the liquid adhesive material from the heat exchange device to a dispensing device; and
   dispensing the liquid adhesive material using the dispensing device.

15. The method of claim 14, wherein heating the liquid adhesive material in the thin slit section further comprises:
   applying heat energy from the generally cylindrical socket in the body using at least one first heater element located within the body; and
   applying heat energy from the interior body member using a second heater element located within the interior body member.

16. The method of claim 14, wherein heating the liquid adhesive material in the thin slit section further comprises:
   applying heat energy from the generally cylindrical socket in the body using at least one first heater element located within the body;
   transmitting heat energy from the body into the interior body member via an end cap securing the interior body member in position within the generally cylindrical socket; and
   applying heat energy transmitted from the end cap into the interior body member to the thin slit section.

17. The method of claim 14, wherein the fluid passageway further includes an inlet section communicating between the adhesive supply and the thin slit section and an outlet section communicating between the thin slit section and the dispensing device, and directing liquid adhesive material through the fluid passageway further comprises:
   dividing the liquid adhesive material into partial adhesive flow portions at the inlet section;
   directing each of the partial adhesive flow portions through a thin slit section; and
   recombining the partial adhesive flow portions at the outlet section before delivery of the liquid adhesive material from the heat exchange device to the dispensing device.

18. The method of claim 14, wherein the interior body member defines a conical end adjacent a first end of the thin slit section and a ring-shaped channel located adjacent a second end of the thin slit section, and directing liquid adhesive material to flow through the thin slit section further comprises:
   guiding flow of the liquid adhesive material into the first end of the thin slit section using the conical end of the interior body member to avoid developing areas of flow stagnation within said fluid passageway; and
   guiding flow of the liquid adhesive material out of the second end of the thin slit section using the ring-shaped channel to avoid developing areas of flow stagnation within said fluid passageway.

19. The heat exchange device of claim 1, wherein the radial thickness of the ring is substantially lesser than a diameter of the inlet.

20. A liquid adhesive system, comprising:
   an adhesive supply configured to provide a supply of liquid adhesive material, the adhesive supply comprising an adhesive melter configured to melt solid or semi-solid unmelted hot melt adhesive to form the liquid adhesive material;
   a dispensing device configured to dispense the liquid adhesive material in an adhesive bonding application;
   a heat exchange device for heating the liquid adhesive material to an application temperature suitable for the adhesive bonding application, the heat exchange device comprising:
      a body having an inlet configured to receive a flow of liquid adhesive material from said adhesive supply and an outlet configured to provide the liquid adhesive material to the dispensing device for the adhesive bonding application;
      a fluid passageway defined in said body fluidly connecting said inlet and said outlet, said fluid passageway including a thin slit section having a length along a fluid flow direction between said inlet and said outlet, a profile of said thin slit section being a continuous ring, said thin slit section having a circumference of the ring and a radial thickness of the ring transverse to the fluid flow direction, the circumference of the ring and the length being substantially greater than the radial thickness of the ring; and
      at least one heating element thermally coupled with said body and configured to heat the liquid adhesive material flowing through said fluid passageway to the application temperature; and
   a controller operatively coupled to said heat exchange device and said adhesive supply, said controller being configured to operate said heat exchange device to heat the liquid adhesive material to the application temperature and to operate said adhesive supply to maintain the liquid adhesive material at a temperature below the application temperature before being heated in said heat exchange device.

21. The liquid adhesive system of claim 20, wherein said heat exchange device is coupled directly with said dispensing device, such that liquid adhesive material is provided directly from said heat exchange device to said dispensing device.

* * * * *